(12) United States Patent
Sachdev et al.

(10) Patent No.: US 10,513,354 B2
(45) Date of Patent: Dec. 24, 2019

(54) SPACECRAFT PAYLOAD EJECTION SYSTEM

(71) Applicant: MACDONALD, DETTWILER AND ASSOCIATES INC., Brampton, Ontario (CA)

(72) Inventors: Tej Singh Sachdev, Milton (CA); John Douglas Lymer, Toronto (CA); Richard Andrew Bryan, North York (CA); Branko Francetic, Toronto (CA); Paul Robert Peacock, Maple (CA); Peter Panagiotis Krimbalis, Toronto (CA)

(73) Assignee: MACDONALD, DETTWILER AND ASSOCIATES INC., Brampton, ON (CA)

( * ) Notice: Subject to any disclaimer, the term of this patent is extended or adjusted under 35 U.S.C. 154(b) by 0 days.

(21) Appl. No.: 16/510,359

(22) Filed: Jul. 12, 2019

(65) Prior Publication Data

US 2019/0352025 A1 Nov. 21, 2019

Related U.S. Application Data

(62) Division of application No. 14/716,795, filed on May 19, 2015.

(60) Provisional application No. 62/000,327, filed on May 19, 2014, provisional application No. 62/000,439, filed on May 19, 2014.

(51) Int. Cl.
*B64G 1/64* (2006.01)

(52) U.S. Cl.
CPC ............. *B64G 1/641* (2013.01); *B64G 1/645* (2013.01)

(58) Field of Classification Search
CPC ........ B64G 1/641; B64G 1/645; B64G 1/002; B64G 2001/643; B64G 1/40; B64G 1/222; B64G 1/66; B64G 1/64; B64G 2005/005
See application file for complete search history.

(56) References Cited

U.S. PATENT DOCUMENTS

| | | | | |
|---|---|---|---|---|
| 3,608,848 A | * | 9/1971 | Cantor | B64G 1/646 244/172.4 |
| 4,834,325 A | * | 5/1989 | Faget | B64G 1/12 136/245 |
| 5,040,748 A | * | 8/1991 | Torre | B64G 1/641 244/137.1 |

(Continued)

*Primary Examiner* — Assres H Woldemaryam
(74) *Attorney, Agent, or Firm* — Hill & Schumacher

(57) ABSTRACT

There is disclosed a Payload Ejection System (PES) able to store any set of payloads for launch and eject that set of payloads at a controlled speed with a low tumble rate while accommodating any offset centre of mass within a restricted volume. The need for ballasting or balancing is eliminated thus freeing up the design space for these payloads. Insensitivity to centre of mass location is enabled by the use of a deployment hinge assembly arrangement which uses two or more non-parallel folding hinge arrangements that allow for linear motion of the output link in one direction while restricting the motion all other directions. One embodiment of the current PES concept uses four (4) hinge panel assemblies, selected to provide optimal stiffness around the entire mechanism. The stiffness of the PES is integral to managing offset centre-of-mass locations by allowing the mechanism to translate the effective force vector to the center of mass location.

9 Claims, 31 Drawing Sheets

(56) References Cited

U.S. PATENT DOCUMENTS

| | | | | |
|---|---|---|---|---|
| 5,040,749 A * | 8/1991 | Johnson | B64G 1/646 244/172.4 |
| 5,104,070 A * | 4/1992 | Johnson | B64G 1/646 244/172.4 |
| 5,860,624 A * | 1/1999 | Obry | B64G 1/641 244/39 |
| 6,547,476 B2 * | 4/2003 | Kaszubowski | B64G 1/641 244/158.1 |
| 9,828,117 B2 * | 11/2017 | Echelman | B64G 1/645 |
| 2001/0017337 A1 * | 8/2001 | Holemans | B64G 1/641 244/158.1 |
| 2002/0171011 A1 * | 11/2002 | Lopata | B64G 1/002 244/158.5 |
| 2007/0125910 A1 * | 6/2007 | Cepollina | B64G 1/007 244/172.6 |
| 2008/0048069 A1 * | 2/2008 | Zheng | B64G 1/641 244/171.7 |
| 2008/0233768 A1 * | 9/2008 | Joshi | H01R 29/00 439/49 |
| 2012/0012711 A1 * | 1/2012 | Ross | B64G 1/641 244/158.2 |
| 2012/0068019 A1 * | 3/2012 | Boccio | H01Q 1/08 244/172.6 |
| 2013/0103193 A1 * | 4/2013 | Roberts | B23Q 3/155 700/245 |
| 2014/0027578 A1 * | 1/2014 | Comtesse | B64G 1/641 244/173.3 |
| 2014/0084113 A1 * | 3/2014 | Barber | B64G 1/641 244/173.2 |
| 2014/0332632 A1 * | 11/2014 | Helmer | B64G 1/641 244/173.2 |
| 2016/0332308 A1 * | 11/2016 | Roberts | B25J 15/0226 |
| 2017/0096241 A1 * | 4/2017 | Johnson | B64G 1/646 |
| 2017/0283097 A1 * | 10/2017 | Holemans | B64G 1/641 |
| 2017/0297747 A1 * | 10/2017 | Peterka, III | B64G 1/002 |
| 2017/0327251 A1 * | 11/2017 | Parissenti | B64G 1/10 |
| 2017/0341782 A1 * | 11/2017 | Rivas S Nchez | B64G 1/641 |

\* cited by examiner

SPACECRAFT PAYLOAD EJECTION SYSTEM

FIELD

The present disclosure relates to systems for hosting payloads on a host spacecraft for the purpose of carrying the payload to orbit and ejecting it from the host spacecraft in a controlled manner. The payload ejection system is the entire system which enables the ejection of a payload from a host spacecraft in a controlled manner. Ejection in a controlled manner is defined as an ejection whereby the ejected payload has no angular momentum or linear momentum transverse to the ejection axis at the time of release.

BACKGROUND

When satellites are launched to orbit (regardless of orbit type) there is often some launch vehicle mass and volume capacity that is not used. One purpose of the system disclosed herein is to use this surplus volume and mass capacity to deliver additional and separate payloads to orbit, from where the payload can proceed with its intended mission. This concept of delivering hosted payloads to particular orbits is described in "DARPA Phoenix Payload Orbital Delivery (POD) System: "FedEx to GEO", Dr. Brook Sullivan et al, AAAIAA Space 2013 Conference and Exposition, Sep. 10-12, 2013, San Diego, Calif. As described in this paper, a payload includes but is not limited to such space systems as another small (micro or nano) spacecraft, replacement materials (e.g. fuel) to replenish another satellite, replacement components for on-orbit servicing repair of another spacecraft, components for in-space assembly of a new space system or spacecraft.

Current orbital payload ejection systems require that the payload centre of mass be closely aligned with the centre of force of the ejection mechanism or else significant tumble rates (undesired angular rates and translational velocities transverse to the ejection axis at the time of release) are created at ejection, which is almost always considered a very negative condition. Accommodating an offset between the mechanism centre of force and the payload centre of mass that remains unknown, but within a prescribed volume, at launch allows for increased flexibility in accommodating payloads. This flexibility is particularly beneficial if there are multiple payload parts that may have specific packaging requirements or irregular shapes. Similarly, endeavouring to make the prescribed volume for the centre of gravity as large as possible maximises the payload accommodation flexibility.

The current state of the art either uses an array of separation springs (e.g. the commercially available Lightband™) that can induce a significant tumble rate if the center of mass is spaced from the ejection mechanism geometric center, or a guide rail system (i.e. Pico-Satellite Orbital Deployer PPOD) for very small payloads (nano-sats) that does not scale well to larger payloads—in excess of tens of kilograms up to a few hundred kilograms—and, further, would be at risk of jamming or binding upon release.

Existing ejection methods are unable to eject a payload with an offset center of mass without causing the payload to tumble. This is a result of the ejection technique; many existing methods exert a force or forces that are on, or average to, the geometric center of the ejection device. If the center of mass of the payload is offset from this geometric center of the ejection device, the payload will tumble. A common technique in the industry is to use springs to eject a payload. If the payload center of mass is offset from the geometric center, the force upon the springs is not evenly distributed. This results in the payload tumbling when the springs are released.

SUMMARY

The present disclosure provides a system and method of ejecting a payload from a host spacecraft in a microgravity environment. The system and method does not require the payload have a geometrically centralized center of mass. It also minimizes the tumble rate of the ejected payload while being insensitive to the location of the centre of mass of that payload.

There is disclosed herein a method for controllably ejecting a payload from a host spacecraft, comprising:

attaching a payload to a payload assembly, releasably affixing the payload assembly to a payload release plate of a payload ejection mechanism, said payload ejection mechanism including a release mechanism;

said payload ejection mechanism including at least two deployment assemblies coupled to said base plate via a first hinge coupling at one end thereof to the base and at another end thereof to said payload release plate via a second hinge coupling, said at least two deployment assemblies being extendable between a stowed position and a fully extended position, said first and second hinge coupling each having a hinge axis, said hinge axes being non parallel to each other so that upon deployment said at least two deployment assemblies are constrained to deploy such that a plane of said payload assembly remains parallel to said base plate;

wherein said payload ejection mechanism accommodates payloads having centers of mass not coincident with the geometric center of mass of said payload release plate in order to eject said payload assembly away from said host spacecraft such that an effective force vector generated by said payload ejection mechanism acts through a center of mass of said payload at a moment of release of said payload assembly from said payload ejection mechanism regardless of the location of said payload center of mass with respect to the geometric center of said payload release plate; and ejecting the payload assembly by activating the release mechanism to deploy said at least two deployment assemblies from their stowed positions to their fully extended positions to force the payload assembly away from the host satellite.

The at least two deployment assemblies are at least two deployment hinge assemblies, said at least two deployment hinge assemblies each including two hinge plates hinged together along a common mid-axis axis along the lengths of each of said hinge plates, and one hinge plate of each of said at least two deployment hinge assemblies being hinged to said base plate along said first hinge coupling and defining a lower hinge axis and the other hinge plate being hinged to said payload release plate along said first hinge coupling and defining an upper hinge axis, and wherein each said common mid-axis, lower hinge axis and upper hinge axis of a given deployment hinge assembly is coplanar with each respective said common mid-axis, lower hinge axis and upper hinge axis of all other deployment hinge assemblies.

The payload ejection mechanism may include at least four deployment hinge assemblies with a first of two pairs of said at least four deployment hinge assemblies being in opposed relationship, and with a second of two pairs of said at least four deployment hinge assemblies also being in opposed relationship such said at least four deployment hinge assemblies form a rectangular shape.

The at least one launch lock mechanism is for restraining and securing said payload ejection system and said payload assembly until a commanded time of deployment at which time the launch lock mechanism is disengaged.

The payload ejection mechanism includes an actuator to actuate said release mechanism.

The actuator may include springs to actuate said payload ejection mechanism.

The actuator may include a motor to actuate said payload ejection mechanism.

The payload assembly may be permanently attachable to a payload.

The payload assembly may be releasably attachable to a payload.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 25a shows the mechanism ready to be released. The launch locks 410 are released, the deployment springs 508 are held in place by the retaining action of the release mechanism 460.

FIG. 25b shows that the mechanism has been activated. The release mechanism 460 has activated and the deployment springs 508, no longer restrained, are causing the upper hinge panel 501 and lower hinge panel 502 to rotate. This causes the payload release plate assembly 600 to accelerate away from the mechanical mounting assembly 400. At this point, release plate assembly 600 and the payload assembly 200 are held together only by the acceleration of the mechanism.

FIG. 25c shows that the mechanism continues to accelerate the payload release plate assembly 600 away from the mechanical mounting assembly 400.

FIG. 25d shows the mechanism at the instant the deployment hinge assemblies 500 are at their full extension and have come to a complete stop.

FIG. 25e shows the mechanism after the deployment hinge assemblies 500 are at their full extension and have come to a complete stop and the payload assembly 200 has separated from the deployment plate assembly 600 and is free to move under its own inertia.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "operably connected" refers to a means of communication between two devices. This can be either a wired or non-wired communication.

As used herein, the term "tumble rate" is a toppling rotational rate about any axis of a 3-axis orthogonal reference frame associated with the centre of mass of the payload or payload assembly that is detrimental to operation and/or recapture of the ejected payload.

Figure 5:
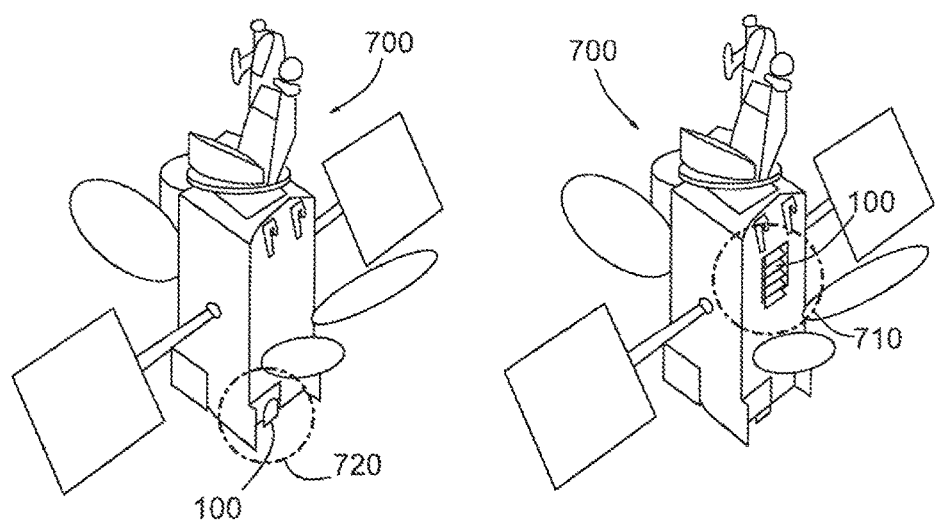
FIG. 5 shows an isometric view of possible locations for the payload ejection system 100 to reside on the hosting spacecraft 700, such as an unused battery bay 720 or an unused portion of an outer surface 710.
Figure 26:
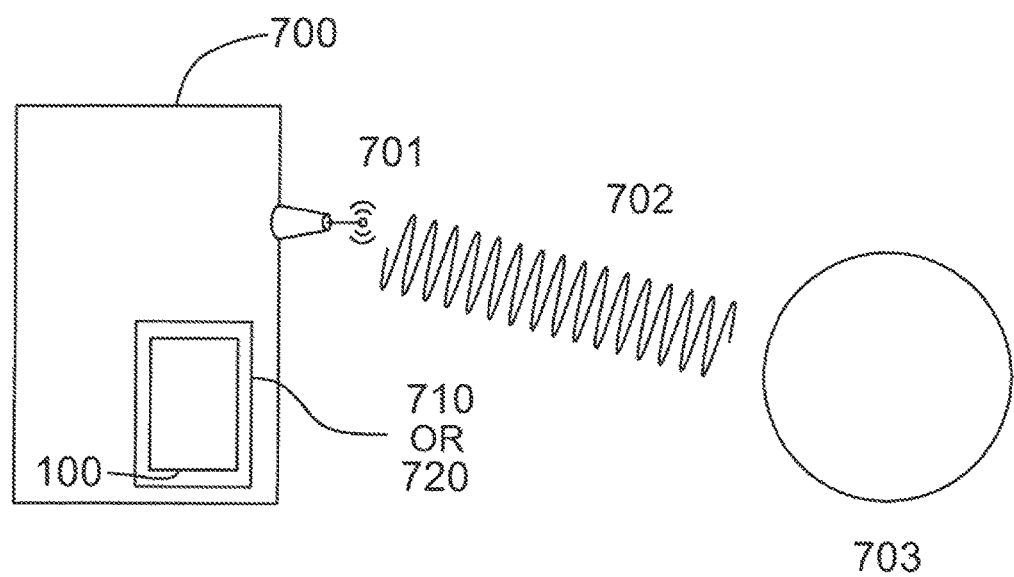
FIG. 26 is a block diagram showing host spacecraft 700 with a communication antenna 701 for communicating with Earth 703 with spacecraft 700 having payload ejection system 100 mounted thereon in compartments such as unused battery bays 720 or an unused exterior surface area 710 of the spacecraft 700.

Referring to FIG. 5, host spacecraft 700 often have surplus mass and volume capacity on their exterior. As shown in FIG. 5, this can include unused battery bays 720 or an unused exterior surface area 710 of the spacecraft 700 that could be used to host a payload ejection system 100, see FIG. 26. In one embodiment of this mechanism, it is proposed to use these vacant spaces to house the payload ejection system 100 and its attached payload 800. Other embodiments can include spacecraft that are designed specifically to carry and eject a plurality of payloads as part of their primary function as opposed to carrying payloads in addition to their primary function.

As mentioned above, some existing methods of ejecting a payload from a host spacecraft 700 in a microgravity environment such as orbit, apply the ejection force along a single vector and as such any displacement of the centre of mass of the payload from the vector of the ejection force produces a moment that is directly related to the distance between the centre of mass and the vector and mass of the payload.

Figure 6A:
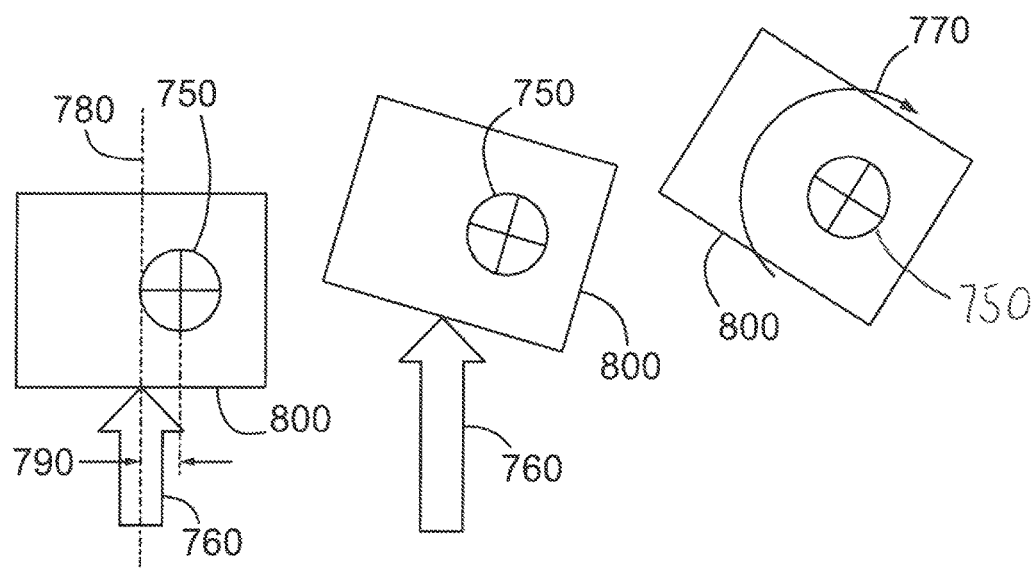
FIGS. 6a and 6b illustrate the rotation or tumble 770 caused by a lateral displacement 790 of the payload 800 centre of mass 750 from the centre of an applied ejection force 760 or from the geometric centre 785 of a plurality of ejection springs 765.

As illustrated in FIG. 6a, the ejection force 760 is applied along the direction 780. The centre of mass 750 of the payload 800 is offset some distance 790 from the direction 780. This combination of force at a distance produces a moment or couple 770 that causes the payload 800 to rotate or tumble. The ejection mechanism itself cannot correct this effect and it requires that the payload either be manufactured with very strict control of the location of the centre of mass, frequently compromising aspects of the payload, or the payload itself must expend resources to correct the tumble.

Figure 6B:
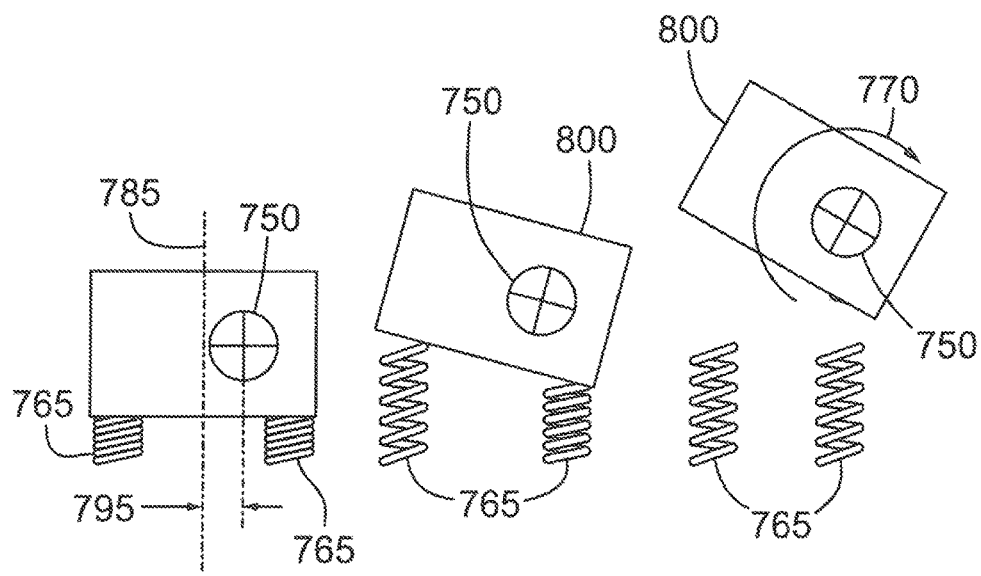

Similarly, other payload ejection methods rely upon the action of a plurality of springs 765 spread over a known area to provide the ejection force as shown in FIG. 6b. In this case any distance between the centre of mass 750 and the geometric centre of the group of springs 795 means that springs closer to the centre of mass 750 exert their force against proportionally more of the payload 800 mass. This again causes a moment or couple as the springs further from the centre of mass extend faster and impart a rotation or tumble 770 to the payload 800. And, again, the ejection mechanism itself cannot correct this effect with the same deleterious impacts on the payload.

There are several methods to mitigate the tumbling effect of an ejected payload. These include: ballasting the payload to collocate the centre of mass with the ejection force vector, and guiding the payload. Ballasting the payload is mass and volume expensive and requires accurate and specific knowledge of the mass properties of the payload. It must also be done uniquely for each payload decreasing operational flexibility. Guiding the payload through the entire acceleration to the ejection speed, as in the case of a PPOD, requires guides. Linear guides are prone to jamming or binding as the payload approaches the end of the guides and the effective engagement of the guides is reduced to zero.

The present payload ejection system uses a plurality of deployment hinge assemblies 500 (FIG. 7) to eject a payload with a negligible amount of induced rotational rate or tumble even though the centre of mass of the payload is, or may be significantly distant from the overall ejection force vector. A key to this mechanism is the use of two or more system linked hinges that produce parallel motion of one plane versus another. The payload ejection mechanism 300 uses at least two pairs of hinges connected to two parallel planes and placed at an angle to each other thus constraining the possible motion of the two planes relative to each other to be parallel.

The present system can be readily scaled up to handle larger payloads by using more than two deployment hinge assemblies 500. The payload ejection system 100 disclosed herein and illustrated has four (4) deployment hinge assemblies 500 but for larger payloads five, six, seven and larger numbers of deployment hinge assemblies 500 may be used. Because the two hinges are at an angle they effectively describe a series of parallel planes at each of the upper, mid and lower hinge axes constraining the base plate 430 and the payload release plate 610 to remain parallel even in the presence of variations in the centre of mass of the payload with respect to the geometric centre of the payload release plate 610.

Figure 7:
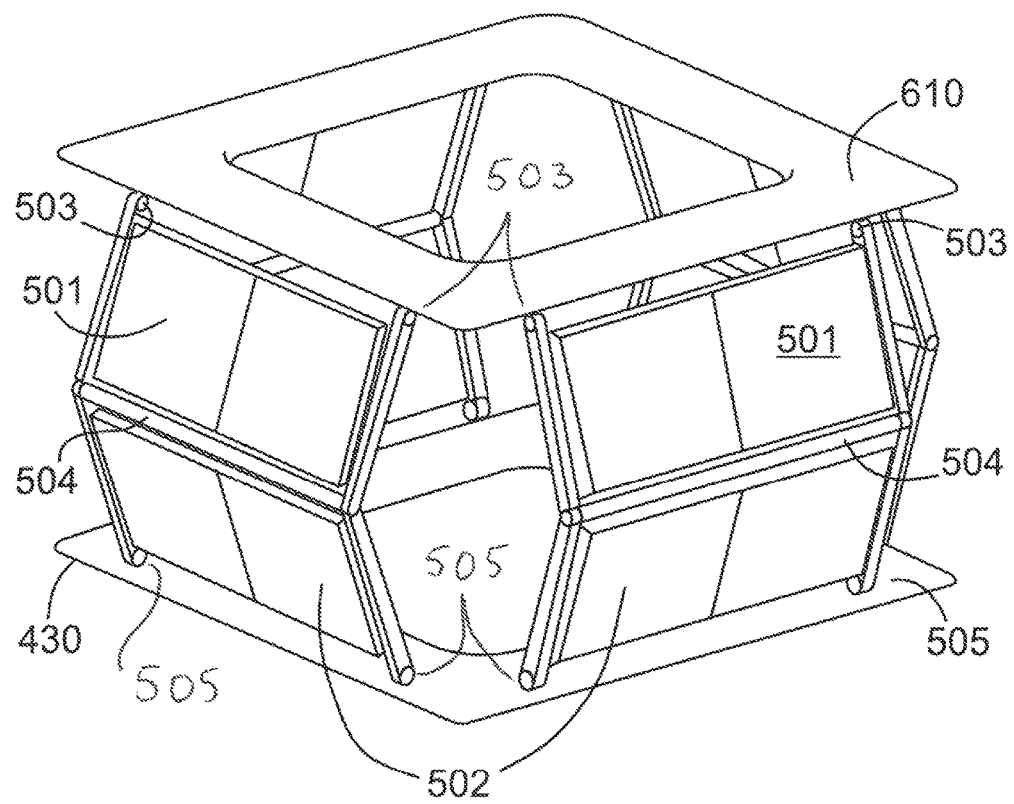
FIG. 7 shows an isometric view of a simplified linkage used in the present system using two (2) pairs of hinge plates, with simplified depictions of the upper hinge plate 501, lower hinge plate 502, upper hinge pin 503, mid hinge pin 504, lower hinge plate 505, base plate 430 and payload release plate 610.

More specifically, FIG. 7 shows a simplified diagram of a deployment hinge assembly 500 used in the payload ejection system 100. To minimise torsional effects and reduce the required stiffness of the deployment hinge assembly 500 the payload ejection system 100 uses a pair of opposed linkages with each pair consisting of two upper hinge plates 501 and two lower hinge plates 502 arranged orthogonally to each other. The mechanism in the figure shows each linkage hinge to bend outward about the mid hinge pin 504, however to make the mechanism more compact the current embodiment has one pair that bends inwards and another that bends outwards. The direction of the hinge action has no bearing on the effectiveness of the mechanism other than compactness and reduced mass.

Figure 1:
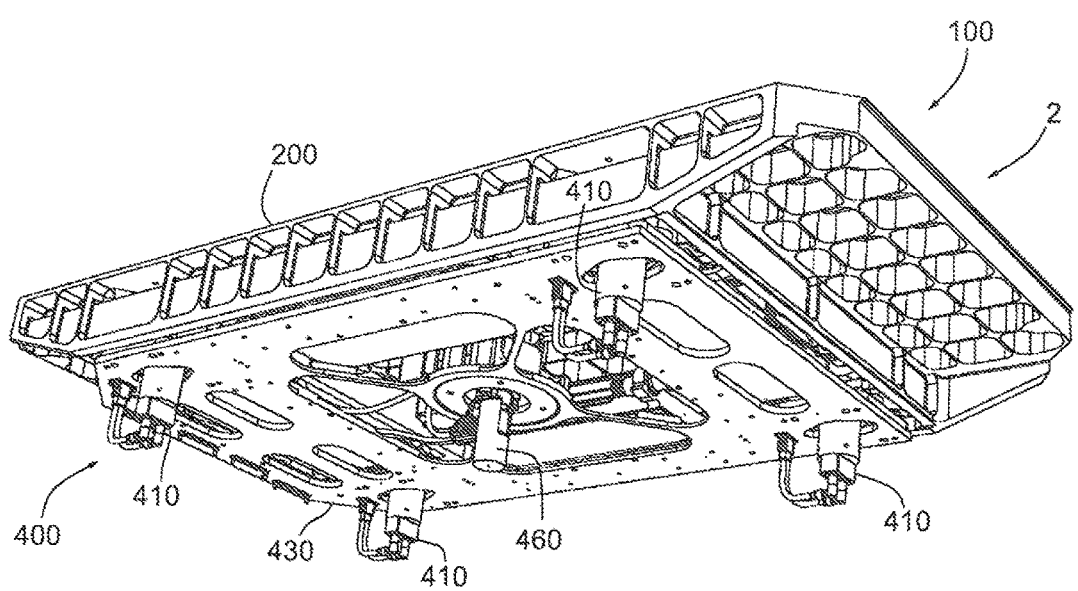
FIG. 1 is an underneath oblique view of the payload ejection system (PES) 100 in the stowed configuration. It shows the relative positions of the payload assembly 200, mechanical mounting assembly 400, with the base plate 430 and the attached launch lock assemblies 410 and release mechanism 460.
Figure 2:
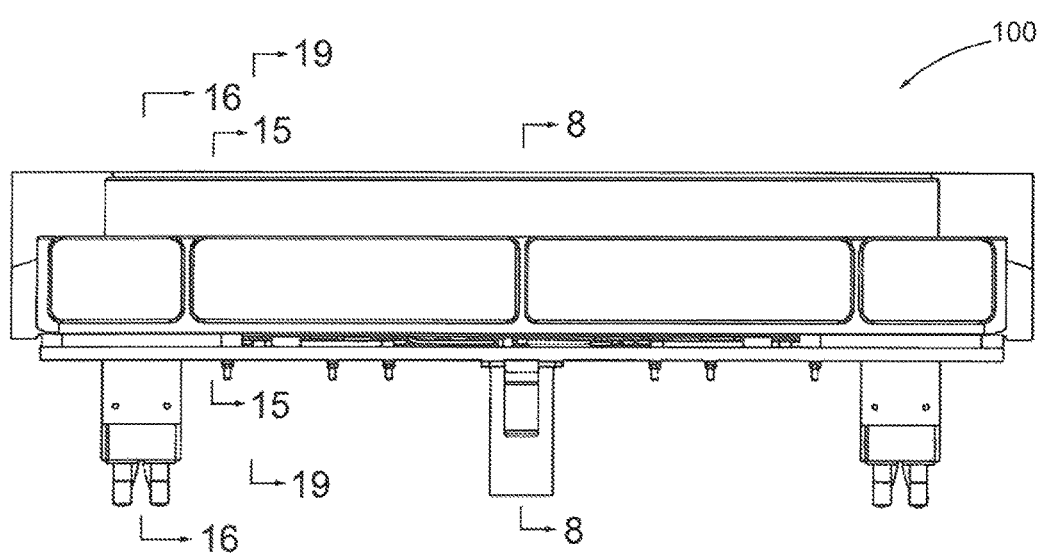
FIG. 2 is an end view, taken along arrow 2 in FIG. 1, of the payload ejection system 100 in the stowed configuration illustrating where the sections for subsequent figures are taken.
Figure 3:
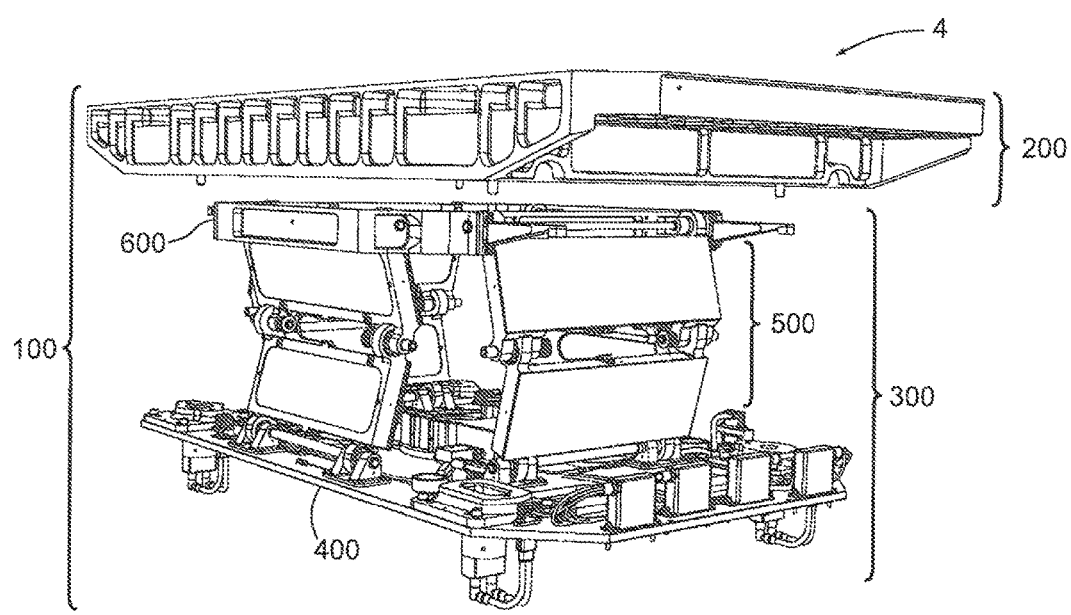
FIG. 3 is an isometric view of the payload ejection system 100 in the deployed configuration. It shows the relative positions of the payload assembly 200 and the payload ejection mechanism (PEM) 300 which comprises the mechanical mounting assembly 400, the deployment hinge assemblies 500 and the payload release plate assembly 600.
Figure 4:
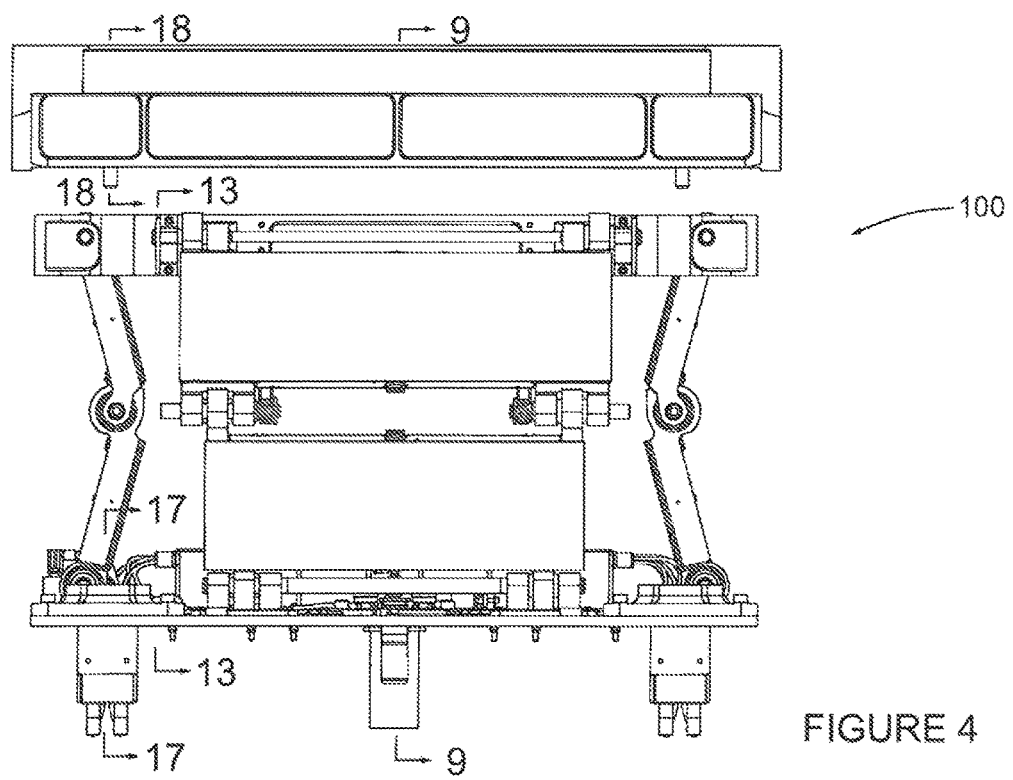
FIG. 4 is an end view of the payload ejection system 100 along the arrow 4 in FIG. 3, in the deployed configuration illustrating where the sections for subsequent figures are taken.

For launch and any powered transit in the stowed configuration shown in FIG. 1 to the ejection site, the payload assembly 200 is secured to the base plate 430 of the payload ejection mechanism 300 by one or more launch lock assemblies 410. The payload ejection mechanism 300 is in the stowed configuration and the deployment springs 508 (FIG. 9) are stowed in their maximum stored energy state.

When it is decided to eject the payload the launch lock assemblies 410 are commanded to release and then the payload ejection mechanism 300 and the deployment springs 508 are held by the release mechanism 460. At the appropriate time, the release mechanism 460 is commanded to release and when it does, the stored energy in the deployment springs 508 starts to force the upper hinge panel 501 and lower hinge panel 502 to straighten up. The connector alignment pins 434 ensure that the payload electrical connector 230 slides cleanly out of engagement with the payload to PEM connector 434 before coming out of contact with the connector alignment features 220 themselves.

The actions of the pair of deployment hinge assemblies 500 drive the payload release plate 610 away from the base plate 430 at a rate determined by the spring forces, the mechanism frictional drag and the mass of the payload and with the payload release plate 610 remaining parallel to the base plate 430.

Figure 12:
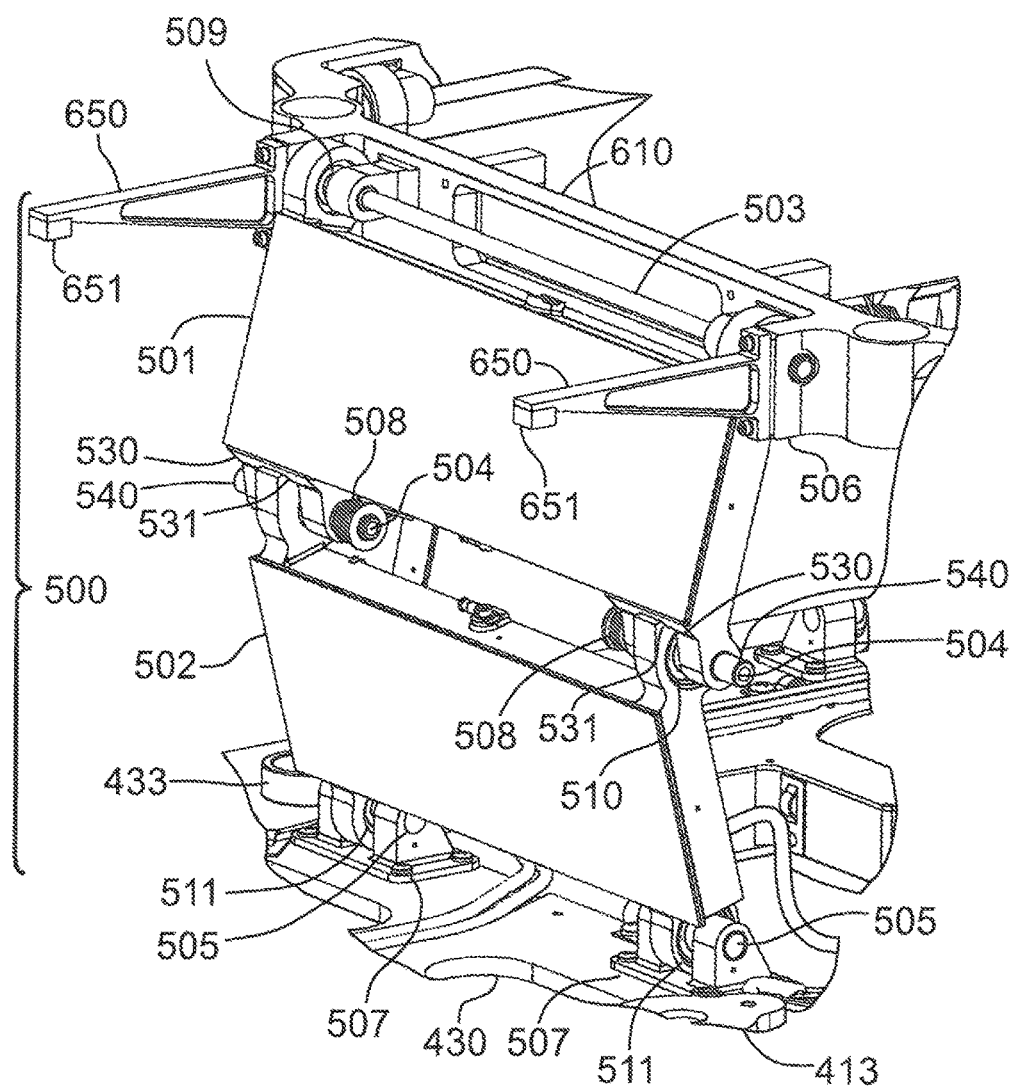
FIG. 12 is an oblique view of one of the deployment hinge assemblies 500 in the deployed configuration. It shows the relative positions of the base plate 430, with the release plate contact 433 and lock mounting plate 413 and the lower hinge bracket 507. Mounted to the lower hinge bracket 507 are the upper hinge plate 501, lower hinge plate 502, upper hinge pin 503, mid hinge pin 504, lower hinge pin 505, upper hinge bracket 506 as part of the payload release plate 610, the deployment springs 508, upper hinge bearings 509, mid hinge bearings 510, lower hinge bearings 511 and the snubber shaft 540. The payload release plate 610 also includes the snubber arms 650 and snubbers 651.
Figure 13:
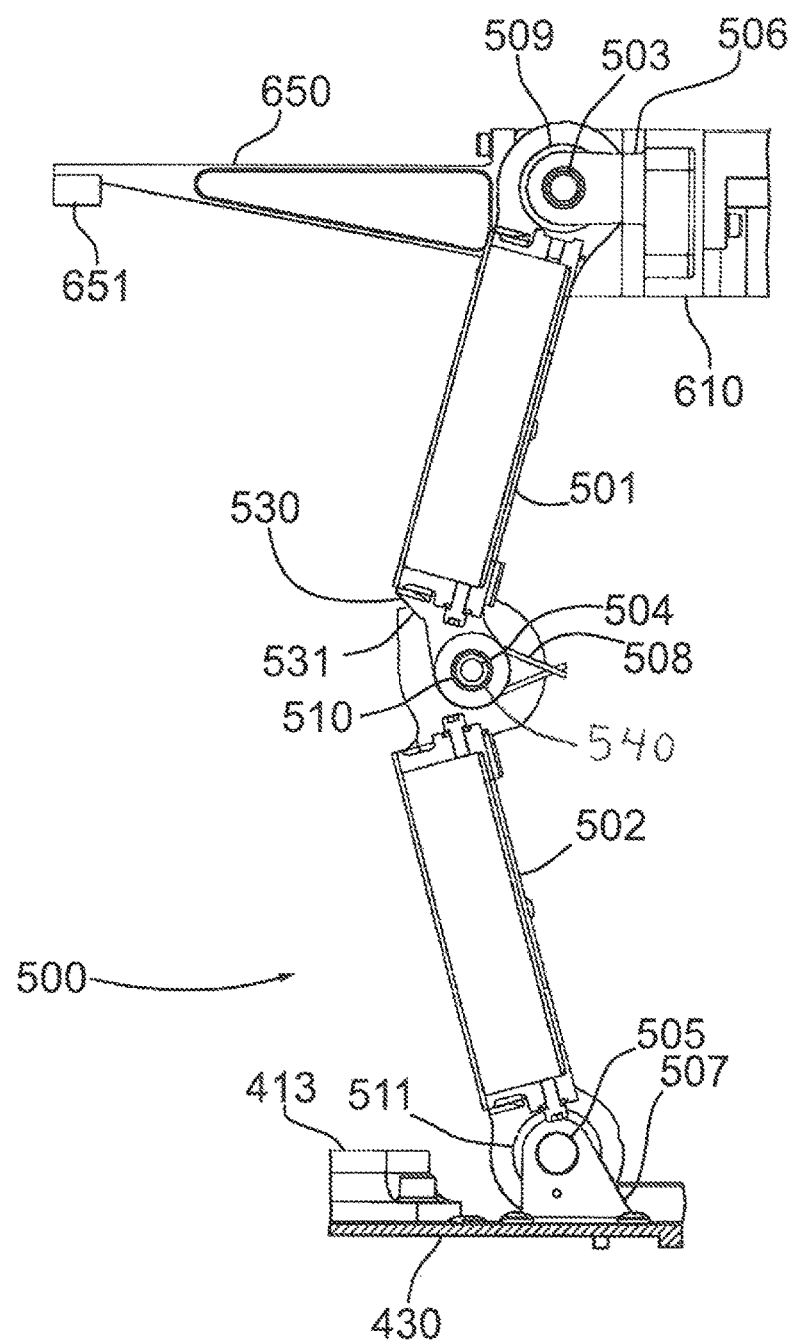
FIG. 13 is a section view along line 9-9 of FIG. 4 of one of the deployment hinge assemblies 500 in the deployed configuration. It shows the relative positions of the base plate 430, and lock mounting plate 413 and the lower hinge bracket 507. Mounted to the lower hinge bracket 507 are the upper hinge plate 501, lower hinge plate 502, upper hinge pin 503, mid hinge pin 504, lower hinge pin 505, upper hinge bracket 506 as part of the payload release plate 610, the deployment springs 508, upper hinge bearings 509, mid hinge bearings 510 lower hinge bearings 511 and the snubber shaft 540. The payload release plate 610 also includes the snubber arms 650 and snubbers 651.
Figure 14:
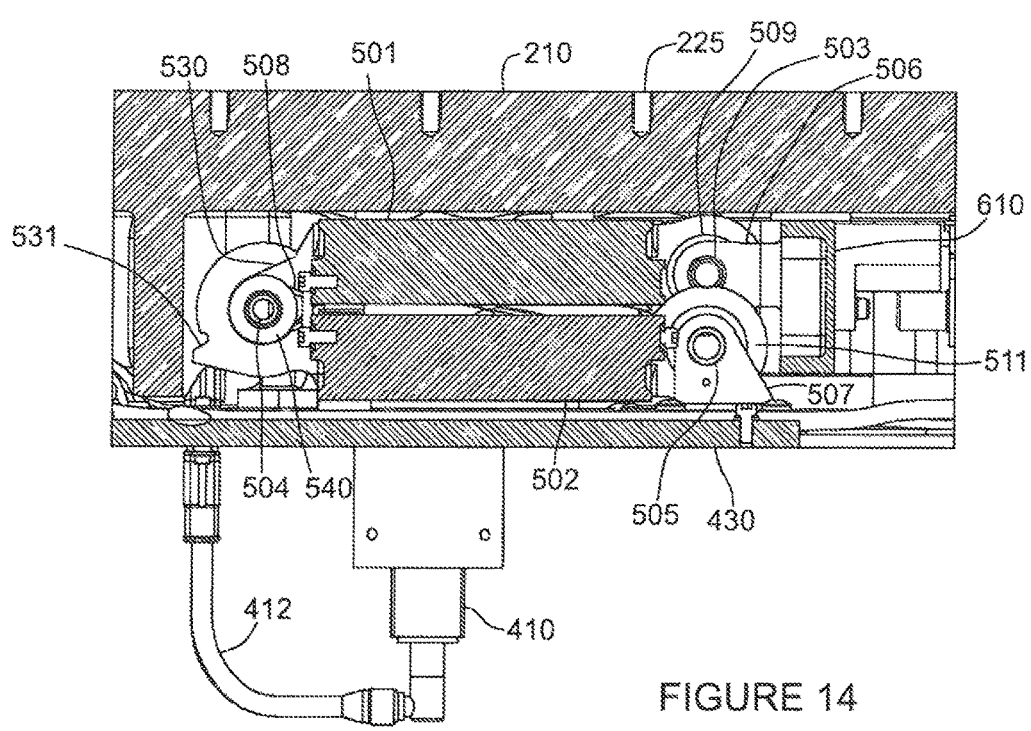
FIG. 14 is a section view along line 8-8 of FIG. 2 of one of the deployment hinge assemblies 500 in the stowed configuration. It shows the relative positions of the payload chassis 210, payload mounting features 225, launch lock assembly 410, lock control harness 412, base plate 430, and the lower hinge bracket 507. Mounted to the lower hinge bracket 507 are the upper hinge plate 501, lower hinge plate 502, upper hinge pin 503, mid hinge pin 504, lower hinge pin 505, upper hinge bracket 506 as part of the payload release plate 610, the deployment springs 508, upper hinge bearings 509, lower hinge bearings 511 and the snubber shaft 540.

At the end of the travel of the deployment hinge assemblies 500 as shown in FIG. 12, the upper hinge plate 501 and the lower hinge plate 502 come into contact when the upper hard stop 530 contacts the lower hard stop 531. The deployment spring 508 force then drops to zero and the payload release plate 610 advances no further. The payload assembly 200 and the attached payload 800 are not physically attached to the release plate assembly 600, but payload assembly 200 is adjacent to payload release plate 610 in physical contact to form an interface between them but not in any way fixed to the payload release plate 610 so that payload assembly 200 simply experiences the uni-axial ejection force created by the deploying mechanism. At the point that the deployment hinge assemblies 500 reach their hard stops 530 and 531, the payload assembly 200 becomes free of the payload release mechanism 300 which continues on the ejection vector due to its own inertia, where its motion is perpendicular to the payload ejection plate 610 at time of release.

The mechanism will now be described in more detail with reference to the figures.

At any time after the launch of the host spacecraft 700 and prior to the time it is desired to eject the payload 800 and payload assembly 200 the computer control system 1200 either determines through internal programming or is commanded by a signal 702 from earth 703 to initiate the payload ejection sequence. Prior to the issuance of the command to eject the payload being given by the computer control system 1200, the payload ejection system 100 is in the stowed configuration as shown in FIGS. 1, 2, 8 and 11.

In this configuration, any power or data required by the payload is passed from the host spacecraft 700 through the PES to host connectors 440a, the payload harness 432, the circuit board 436 to the PEM harness sockets 437 held by the payload to PEM connectors 435. The power and data then crosses to the payload assembly 200 via the payload harness pins 231 held by the payload electrical connectors 230. A harness connects the payload harness pins 231 to the payload 800 and the payload assembly 200. This harness is not shown because it is specific to each combination of payload 800 and payload assembly for each use of the payload ejection system 100.

The commands to initiate payload 800 ejection are provided to or generated by the computer control system 1200 and passed to the payload ejection mechanism 300 via PES to host connectors 440b and launch lock harness 431. The launch lock harness 431 provides a means to provide power and data connectivity to the launch lock assemblies 410 and the release mechanism 460 and any sensors (not present in this embodiment) that may required for the operation and monitoring of the payload ejection mechanism 300.

Figure 16:
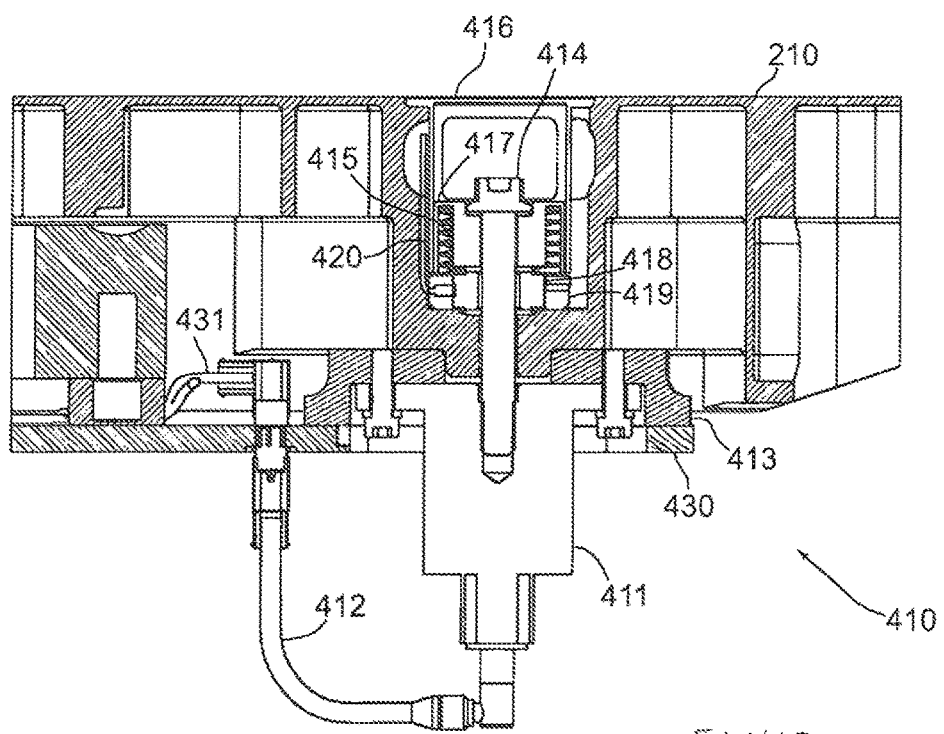
FIG. 16 is a partial section view along line 16-16 of FIG. 2 of one of the launch lock assemblies 410 in the stowed configuration. It shows the relative positions of the payload chassis 210, launch lock assembly 410, lock release mechanism 411, lock control harness 412, lock mounting plate 413, retaining bolt 414, retraction spring 415 in compressed configuration, lock bolt housing 416, spring housing 417, load cell 418, load cell housing 419, load cell harness 420, base plate 430 and launchlock harness 431.
Figure 17:
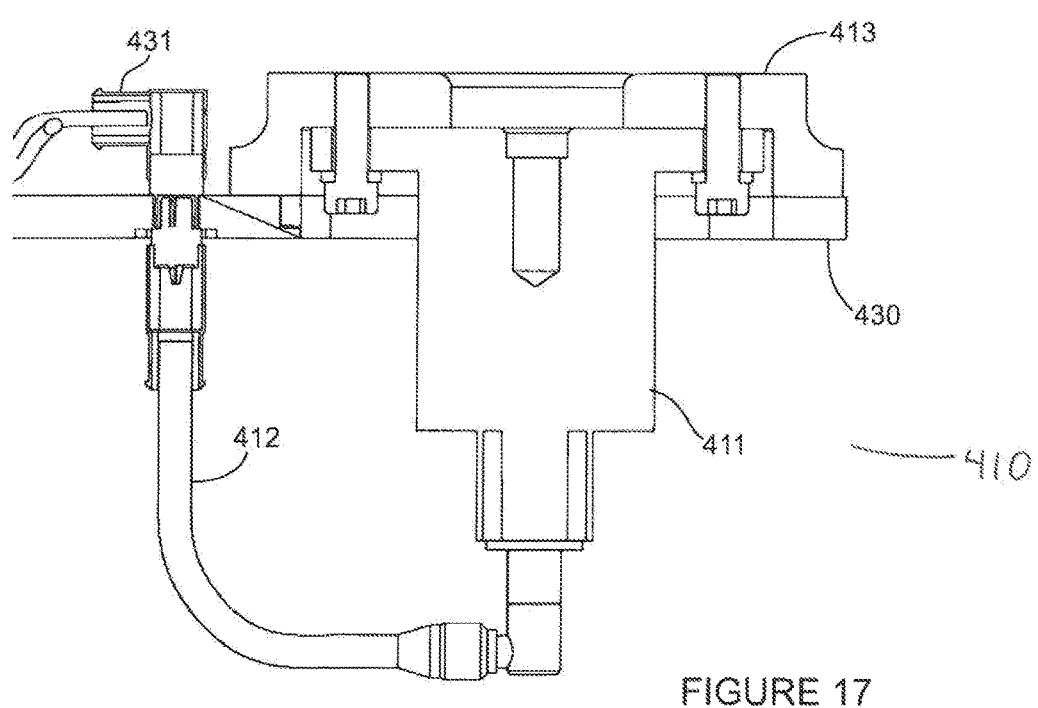
FIG. 17 is a partial section view along line 17-17 of FIG. 4 of one of the launch lock assemblies 410 in the deployed configuration. It shows the relative positions of the lock release mechanism 411, lock control harness 412, lock mounting plate 413, base plate 430 and launch lock harness 431.
Figure 18:
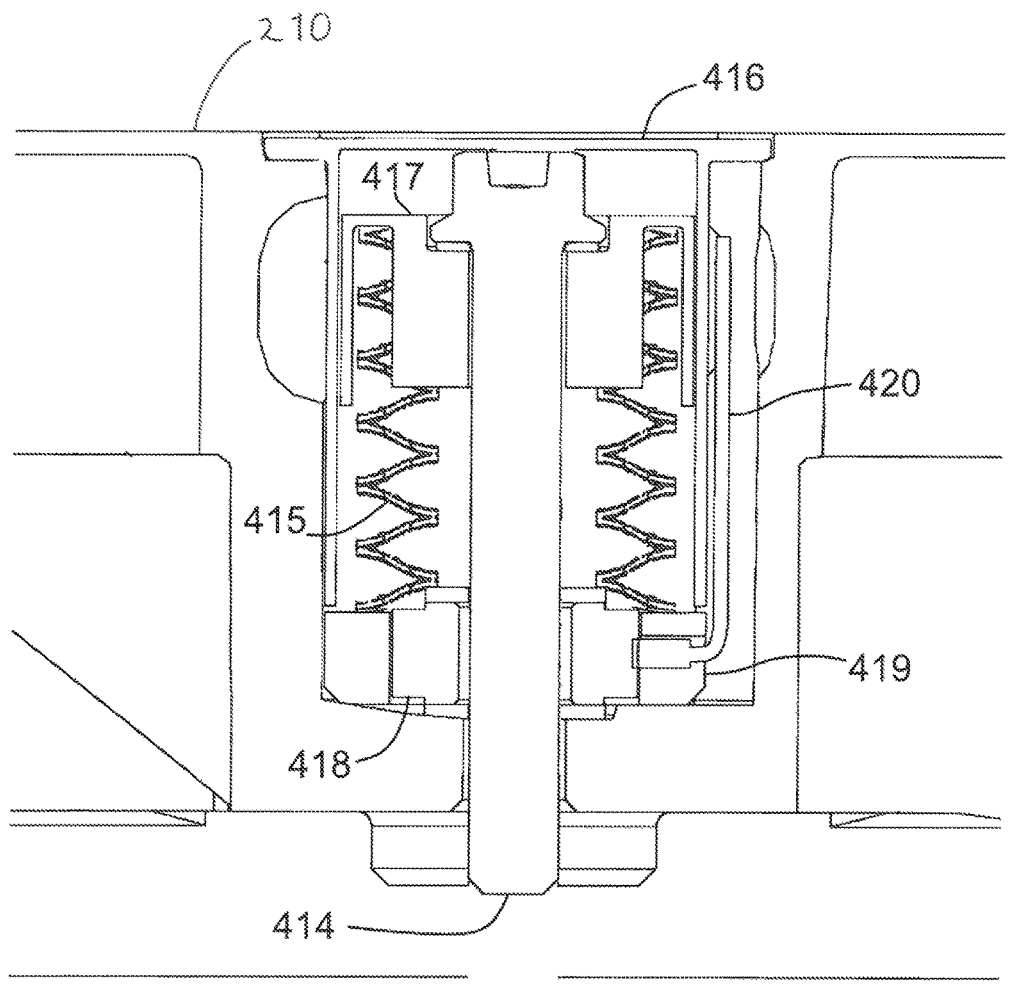
FIG. 18 is a partial section view along line 18-18 of FIG. 4 of one of the launch lock assemblies 410 in the deployed configuration. It shows the relative positions of the payload chassis 210, retaining bolt 414, retraction spring 415 in extended configuration, lock bolt housing 416, spring housing 417, load cell 418, load cell housing 419 and load cell harness 420.

Upon the command to operate the launch lock assemblies 410 and referring to FIGS. 16, 17 and 18 the signal and power from the launch lock harness 431 passes to each the lock control harnesses 412. In this embodiment, the launch lock assemblies 410 are commercially available separable nut devices. Upon command, the lock release mechanism 411 causes the nut within the lock release mechanism 411 to separate releasing the retaining bolt 414. The retraction spring 415 is also released and moves the spring housing 417 and the retaining bolt 414 away from the base plate 430 and up into the lock bolt housing 416, preventing the retaining bolt from causing the payload ejection system 100 from binding or fouling.

Figure 20:
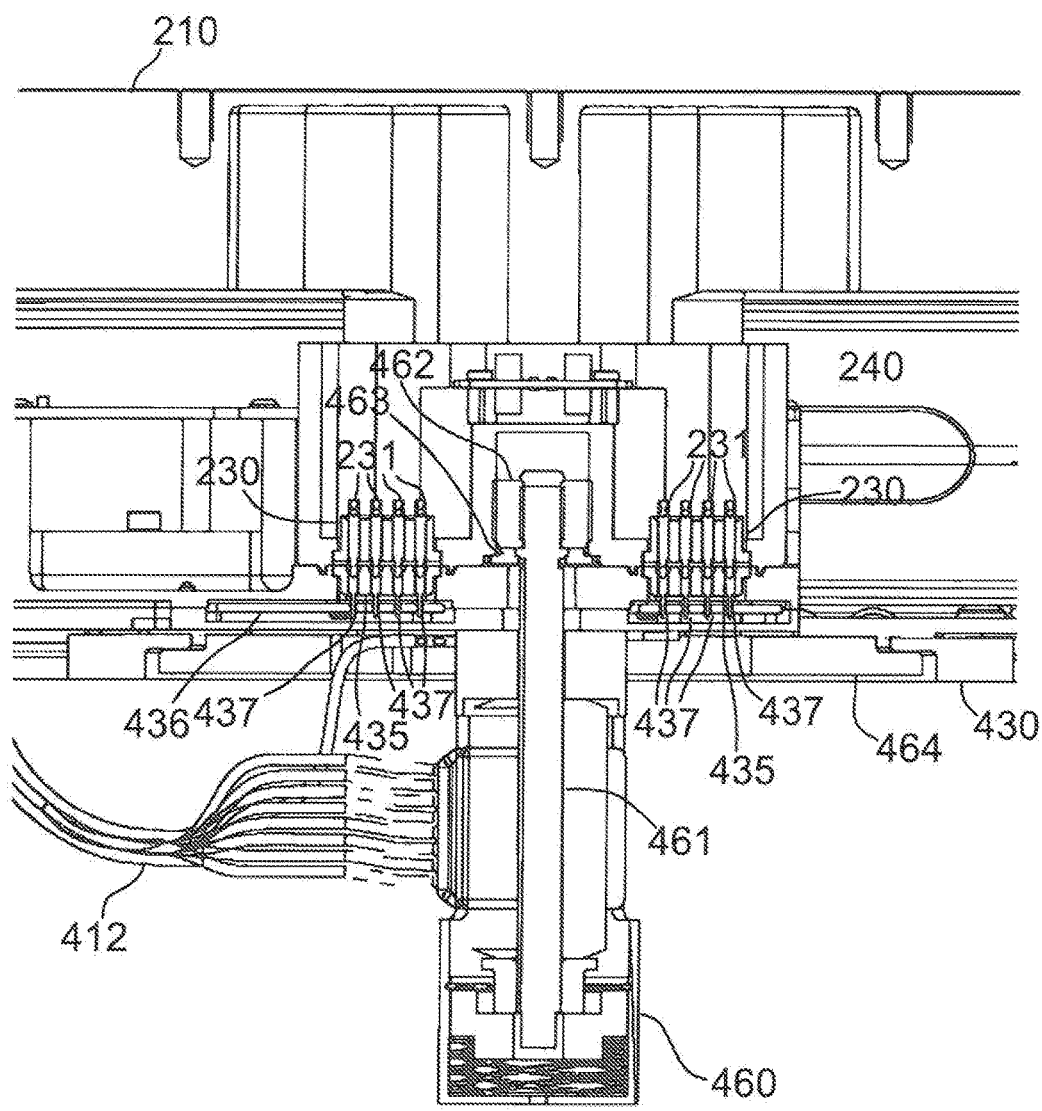
FIG. 20 is a partial section view along line 8-8 of FIG. 2 showing the release mechanism 460 in the stowed configuration. It shows the relative positions of the release mechanism 460, release shaft 461, release nut 462, washer 463, mounting plate 464, lock control harness 412, base plate 430, payload to PEM connectors 435, circuit board 436, PEM harness sockets 437, payload electrical connector 230, payload harness pins 231 and payload electrical box 240.
Figure 21:
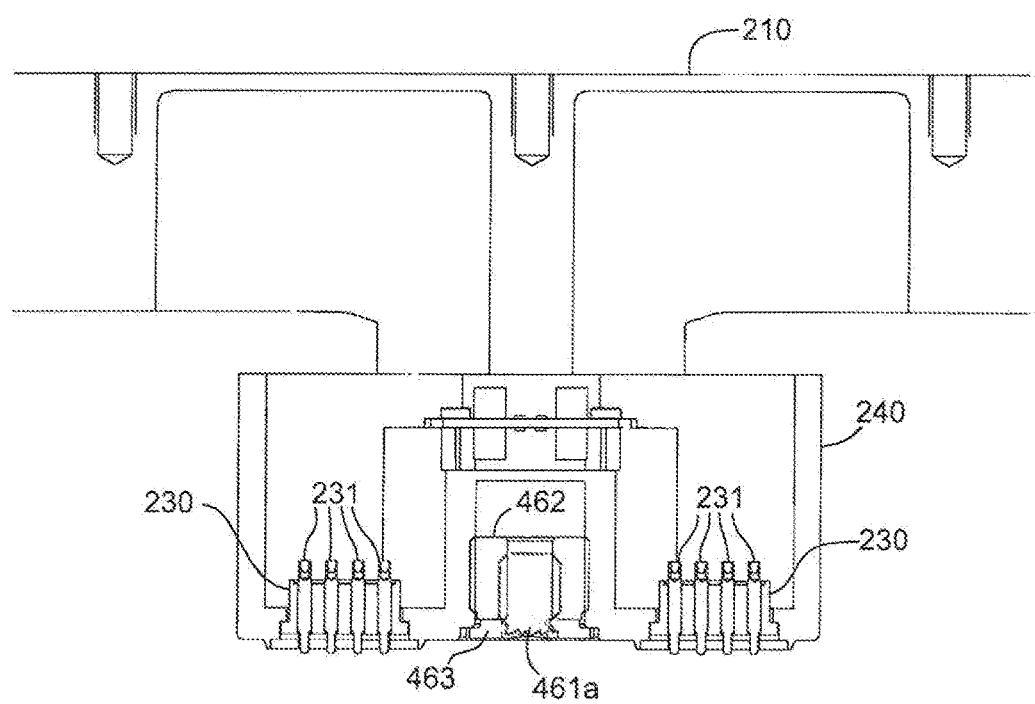
FIG. 21 is a partial section view along line 9-9 of FIG. 4 of the payload side of the release mechanism 460 in the deployed configuration. It shows the relative positions of the payload chassis 210, release shaft head 461a, release nut 462, washer 463, payload electrical connector 230, payload harness pins 231 and payload electrical box 240.
Figure 22:
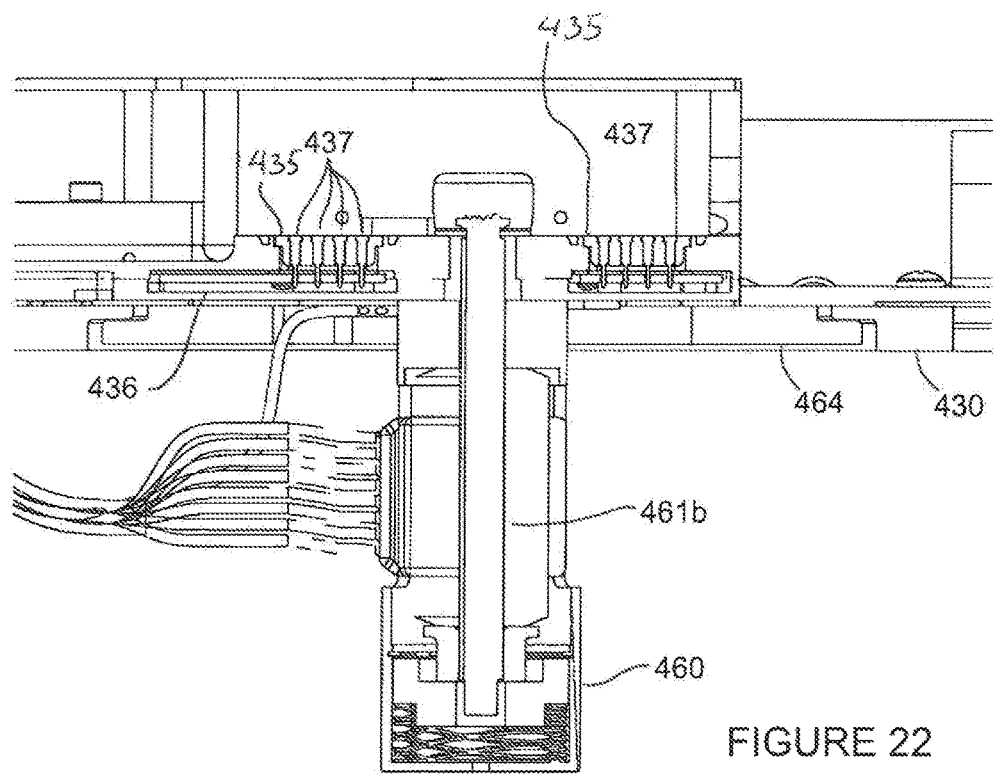
FIG. 22 is a partial section view along line 9-9 of FIG. 4 of the host side of the release mechanism 460 in the deployed configuration. It shows the relative positions of the base plate 430, release mechanism 460, release shaft stub 461b, mounting plate 464, lock control harness 412, payload to PEM connectors 435, circuit board 436 and PEM harness sockets 437.
Figure 23:
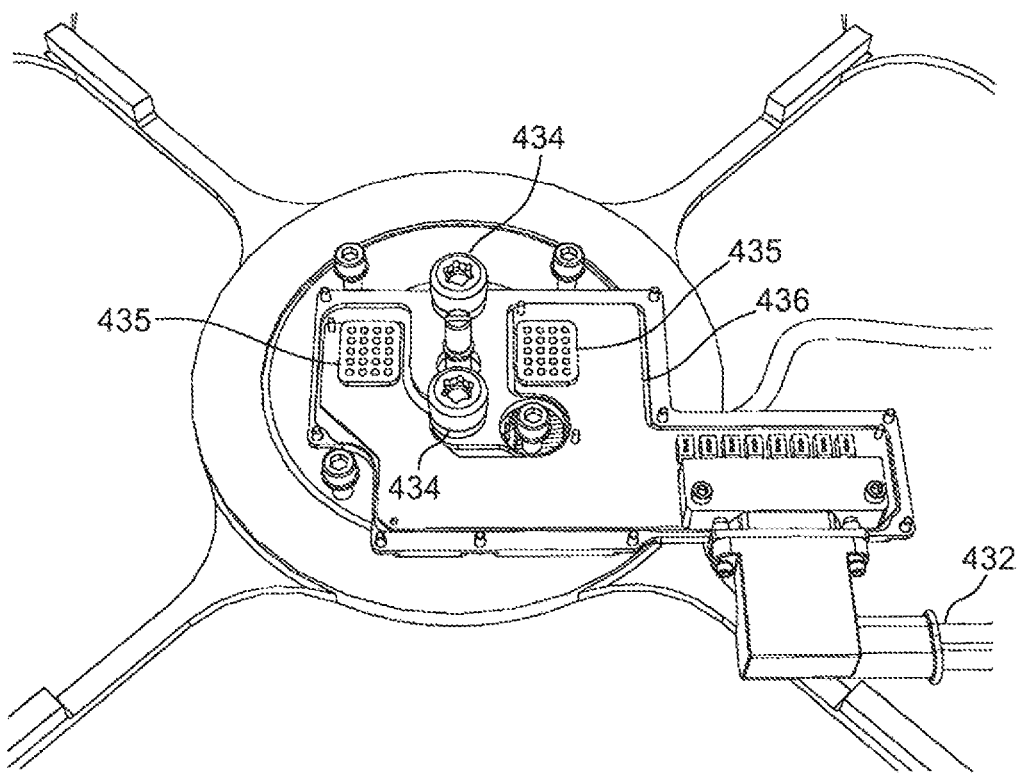
FIG. 23 is an oblique view of the host-side electrical connections between the PEM 300 and the payload assembly 200 showing the payload harness 432, connector alignment pins 434, payload to PEM connectors 435 and circuit board 436.
Figure 24:
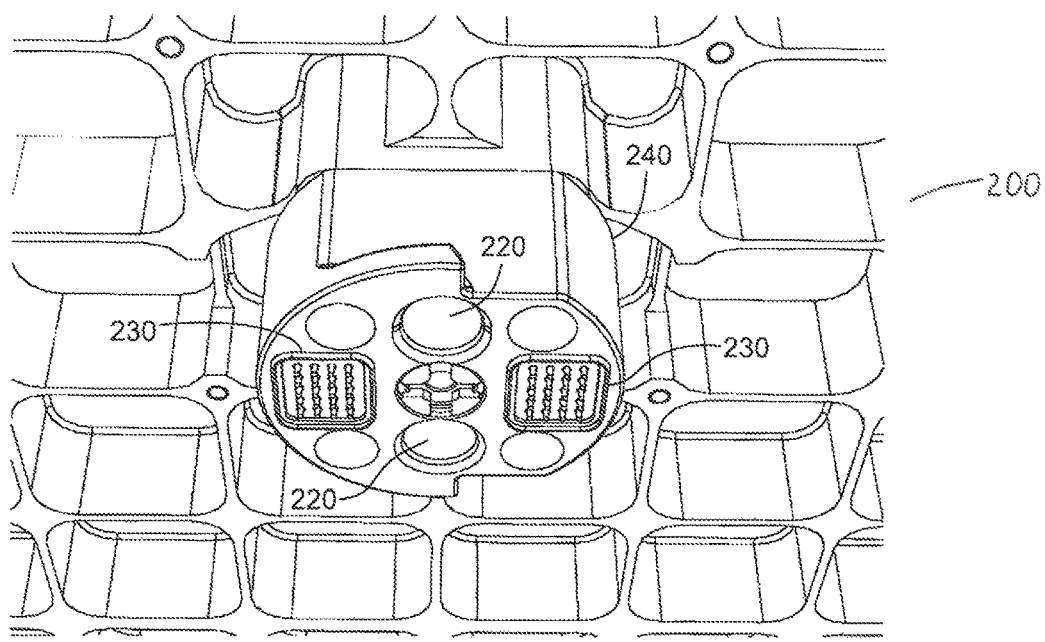
FIG. 24 is an oblique view of the payload-side electrical connections between the PEM 300 and the payload assembly 200 showing the payload electrical connectors 230, connector alignment features 220 and the payload electrical box 240.
Figure 25A:
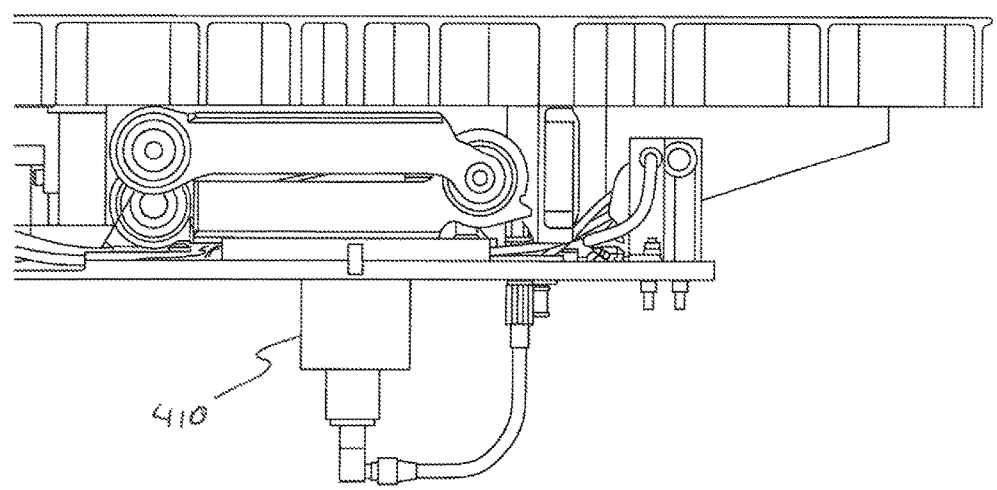
FIGS. 25a, 25b, 25c, 25d, and 25e are a sequence of partial section views along line 8-8 of FIG. 2 showing the deployment sequence as the deployment hinge assemblies 500 accelerate the payload release plate assembly 600 and payload assembly 200 away from the mechanical mounting assembly 400 until the deployment hinge assemblies 500 reach the end of their travel and the payload assembly 200 separates from the payload release plate assembly 600 and continues onward under its own inertia.
Figure 25B:
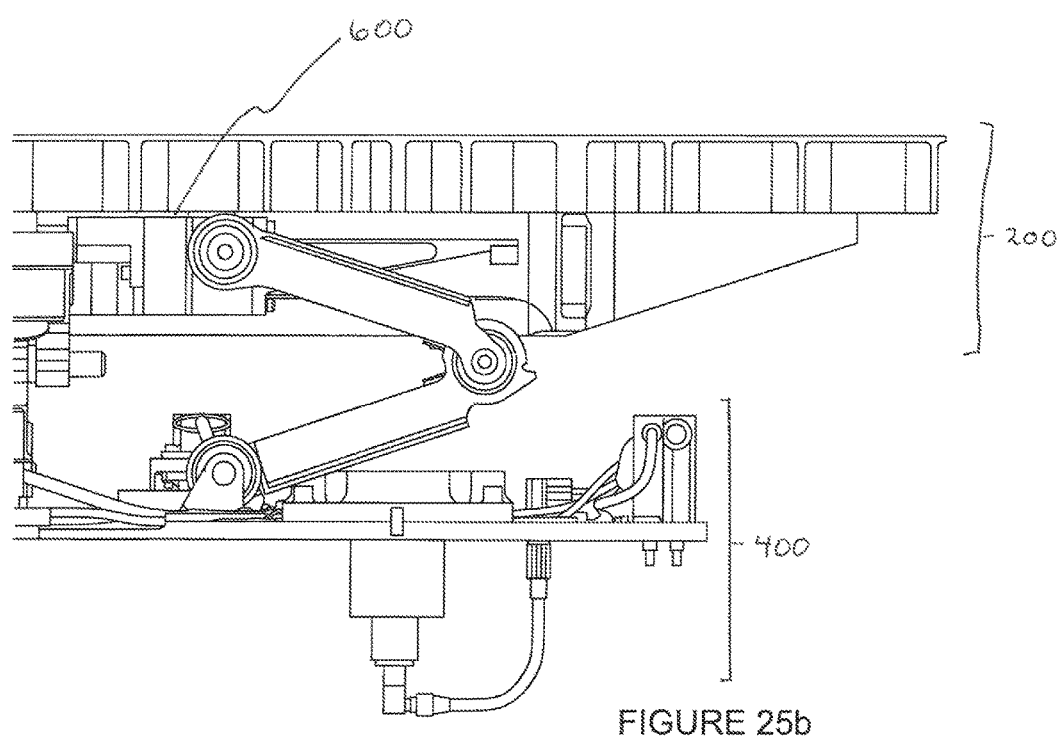
Figure 25C:
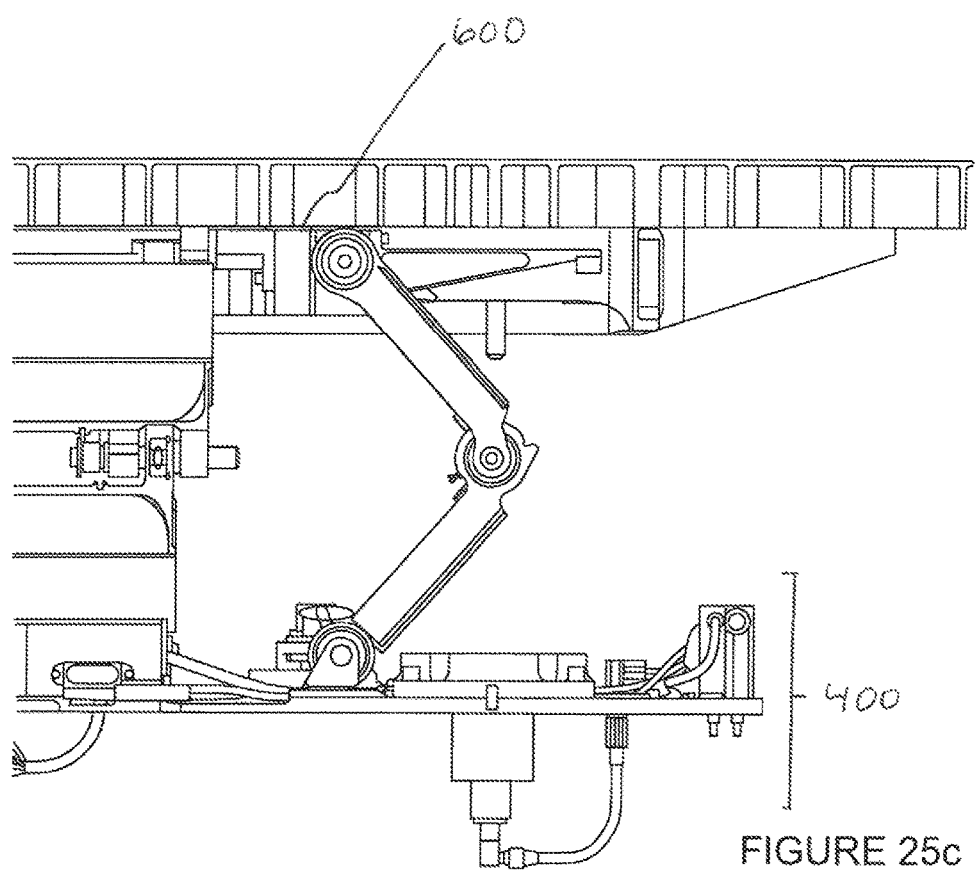
Figure 25D:
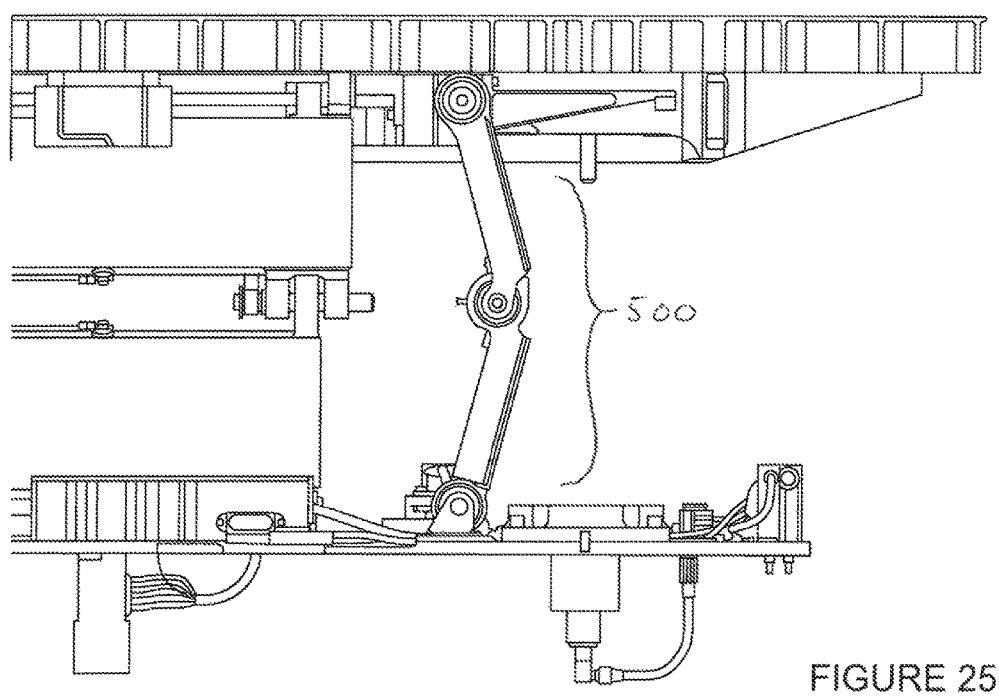
Figure 25E:
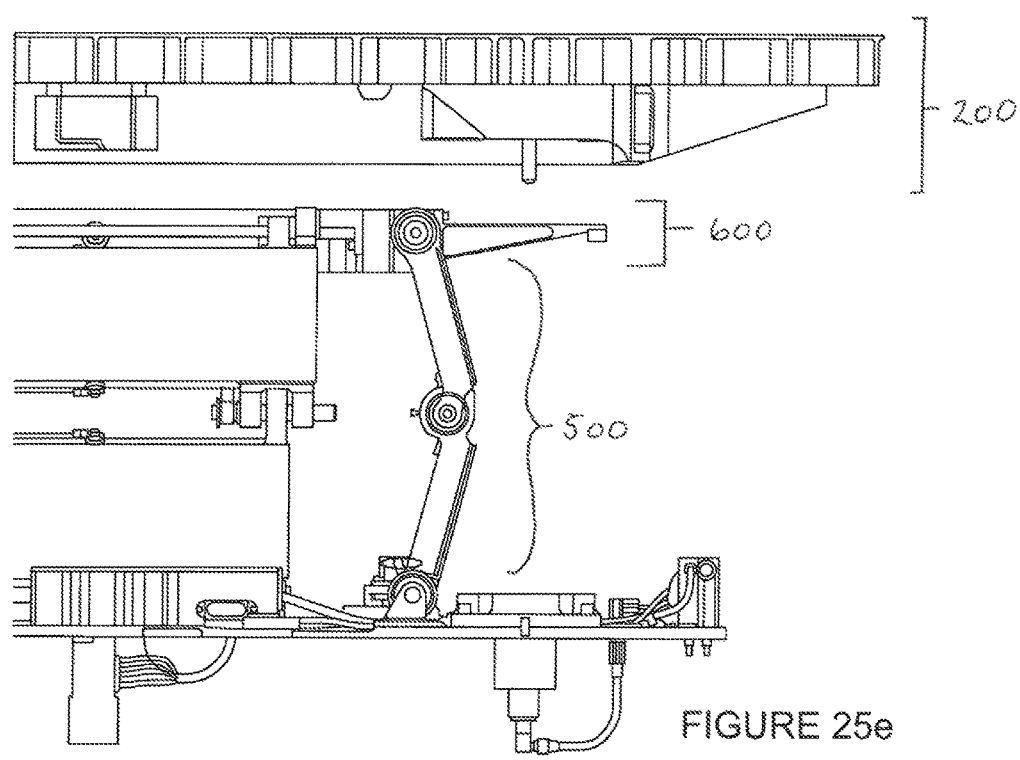
Figure 27:
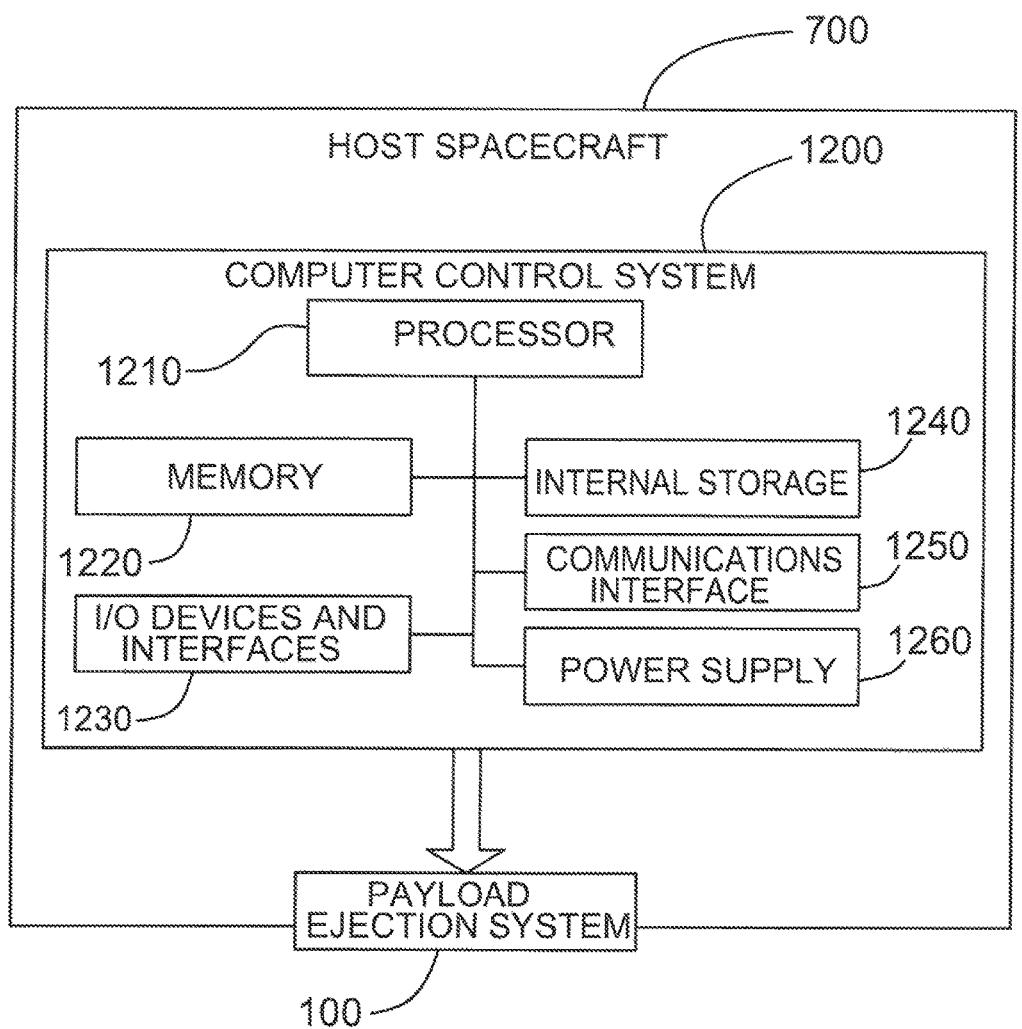
FIG. 27 is a block diagram of a non-limiting exemplary computer system coupled to the payload ejection system 100 which contains a central processor 1210 interfaced with a memory storage device 1220, input/output devices and interfaces 1230, a power supply 1260, an internal storage 1240 and a communications interface 1250.

Referring to FIGS. 20, 21 and 22, prior to initiation, the payload ejection system 100 is held together by that action of the release mechanism 460 that prevents the deployment springs 508 from ejecting the payload 800. At the appropriate time, as determined by programming within the central computer system 1200 (see FIG. 27) or passed to the central computer system 1200 from earth 703 by signals 702 to the host satellite 700. see FIG. 26. The ejection command from the central computer system 1200 is passed to the payload ejection mechanism 300 via the PES 100 to host connectors 440b (see FIG. 11) and the launch lock harness 432 which connects to the release mechanism 460.

In this embodiment, the release mechanism 460 is a commercially available frangible bolt device. Upon command the release mechanism 460 causes the release shaft 461 to fracture in a precise manner leaving the bulk of the release shaft 461b within the release mechanism 460 attached to the mounting plate 464 and then to the base plate 430. The remaining portion of the release shaft 461a remains attached to the release nut and attached to the payload assembly 200 during the ejection sequence.

The deployment hinge assemblies 500 (described in detail below) push the payload assembly 200 away from the payload ejection mechanism 300. Referring to FIGS. 20, 21, 22, 23 and 24 in order to provide a clean release of the release mechanism 460, payload to PEM connectors 435 and circuit board 436 are fixed to mounting plate 464 which is attached to base plate 430 in such a way to permit limited movement in the plane of the base plate 430 and perpendicular to that plane. This movement removes any stresses on the release mechanism 460 and electrical connectors 230 and 435 that might prevent them from disengaging easily. To further guide the disengagement of the connectors 230 and 435 during ejection, the alignment of the payload electrical connectors 230 to the payload to PEM connectors 435 is maintained by the connector alignment pins 434 that are mounted releasably within the connector alignment features 220 that form a part of the payload electrical box 240. By the combined action of close manufacturing tolerances and lubricated surfaces the connector alignment pins 434 slide easily within the connector alignment features 220 and yet restrain unwanted movement between the payload electrical connectors 230 and the payload to PEM connectors 435. Upon ejection, as the payload assembly 200 moves away from the payload ejection mechanism, the payload harness pins 231 that are part of the payload electrical connectors 230 slide out of engagement of the PEM harness sockets 437 that are part of the PEM connectors 435 while the connector alignment pins 434 are still engaged within the connector alignment features 220. After the payload harness pins 231 have completely moved out of engagement with the PEM harness sockets 437 the connector alignment pins 434 then move out of engagement with the connector alignment features 220.

The deployment hinge assemblies 500 provide the force that enables the ejection of the payload 800 and payload assembly 200. Referring to FIGS. 12, 13, 14 and 15 the deployment hinge assemblies 500 work in the following manner. As explained above, when the release mechanism 460 (FIG. 22) is activated the payload release plate 610 is then free to be acted upon by the deployment hinge assemblies 500. Specifically, the deployment springs 508 are configured to act upon the upper hinge plate 501 and the lower hinge plate 502 in such a way as to force them from the collapsed or stowed configuration (FIG. 14) to the extended or deployed configuration (FIG. 12). The configuration of the deployment hinge assemblies 500, specifically the use of a system of two or more linked hinge pairs produces parallel motion of one plane versus another. The deployment hinge assemblies 500 use at least two sets of hinges connected to two parallel planes, the base plate 430 and the payload release plate 610, and placed at an angle to each other thus constraining the possible motion of the two planes to be parallel. A preferred embodiment of the payload ejection system disclosed herein has four (4) deployment hinge assemblies 500 and any pair of adjacent, non-parallel deployment hinge assemblies 500 are sufficient to constrain the motion of the payload release plate 610 to be parallel to the base plate 430, however the use of additional deployment hinge assemblies 500 reduces the torsional loads within the mechanism and reduces the required stiffness of the deployment hinge assemblies 500 advantageously reducing the mechanism mass and increasing reliability.

As the deployment springs act upon the upper hinge plate 501 and the lower hinge plate 502 they rotate about the mid hinge pins 504 which then causes the upper hinge plate 501 to rotate around the upper hinge pin 503 and the lower hinge plate 502 to rotate around the lower hinge pin 505. The physical arrangement of one deployment hinge assembly 500 in relationship to any adjacent deployment hinge assembly 500, is characterized by the two deployment hinge assemblies 500 being attached to the payload deployment plate 610 and the base plate 430 such that a) all of the upper hinge pins 503 are in one plane,
b) all of the mid hinge pins 504 are in a second plane and
c) all of the lower hinge pins 505 are in a third plane and that
d) the axes of all of these hinge pins (503, 504 and 505) form a non-zero angle (in this case they are orthogonal) with those of the adjacent deployment hinge assembly 500.

This means that the minimum two adjacent hinge assemblies effectively describe a series of parallel planes at each of the upper, mid and lower hinge axes, preventing the base plate 430 or the payload release plate 610 from being pushed out of parallel as the deployment springs 508 act to extend the individual deployment hinge assemblies 500. This constrained motion is what forces the payload release plate 610 to move in a manner parallel to the base plate 430 when (referring to FIG. 6a or 6b) even when the center of mass 750 of the payload 800 is a significant distance 790 from the total ejection force vector 760 as applied by the deployment hinge assemblies 500.

As the deployment hinge assemblies 500 reach their desired limit of travel (refer to FIGS. 13 and 14) the upper hard stop 531, which is a feature on the upper hinge plate 501, comes into contact with the lower hard stop 532 which is a feature on the lower hinge plate 502, and the extension of that deployment hinge assembly 500 comes to a stop. Due to the arrangement of angularly arranged deployment hinge assemblies 500, each deployment hinge assembly 500 will come to its end of travel at substantially the same time therefore ending the ejection acceleration of the payload release plate 610 away from the base plate 430.

Figure 19:
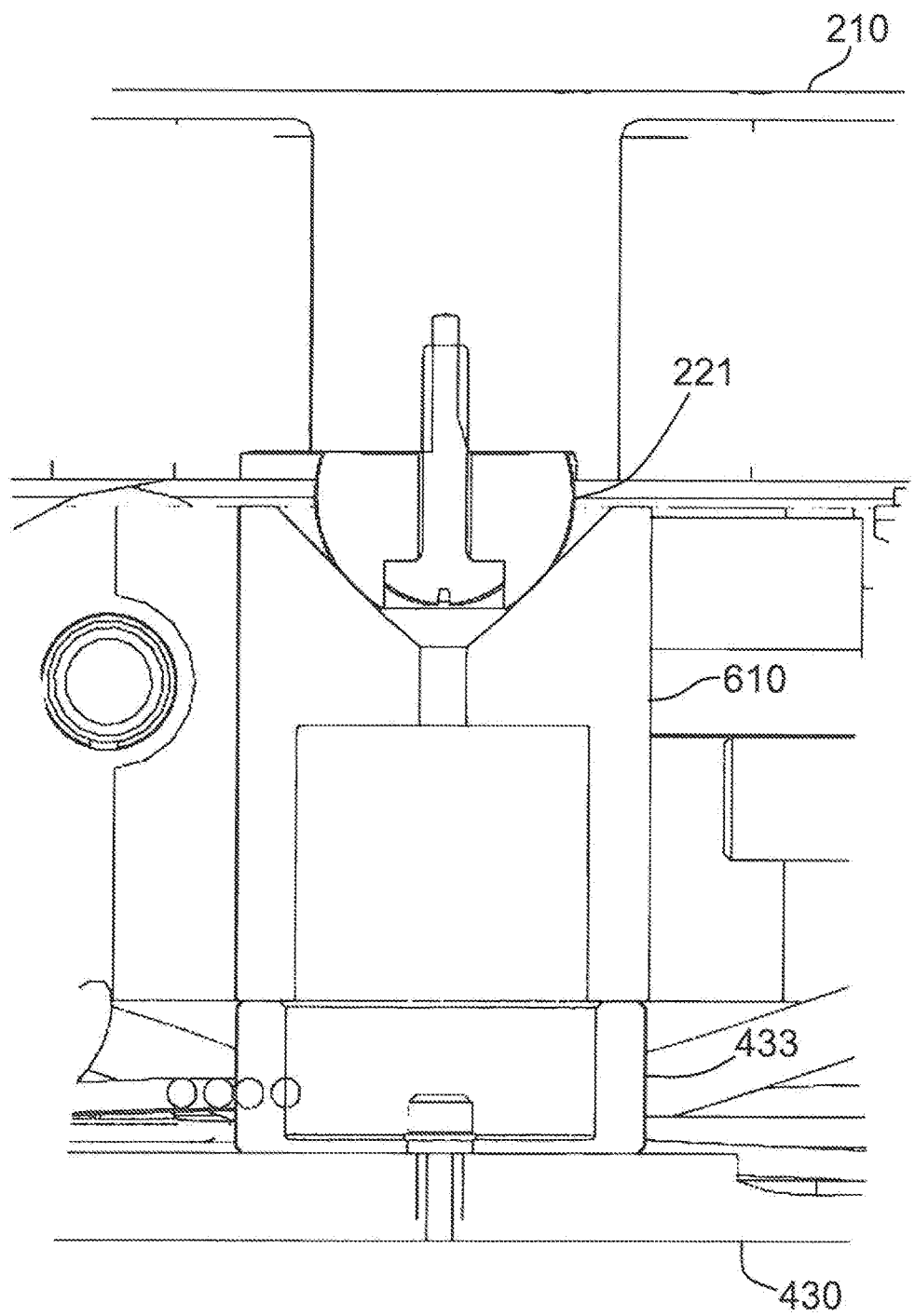
FIG. 19 is a partial section view along line 19-19 of FIG. 2 of one of the deployment load paths in the stowed configuration. It shows the relative positions of the payload chassis 210, payload contact 221, payload release plate 610, release plate contact 433 and base plate 430.

Referring to FIG. 19, in the stowed configuration there is no direct loading between the payload contacts 221, the payload release plate 610 and the release plate contact 433. Operation vibrations and loads may cause some contact between all three components and the release plate contact 433 is designed to restrict any excessive movement between the payload release plate 610 yet remaining free of the payload release plate 610 in nominal conditions. Upon release mechanism 460 activation, as the deployment hinge assemblies 500 act to push the payload release plate 610 away from the base plate 430, the payload release plate 610 now comes into firm contact with the payload contacts 221 at four places. The acceleration of the payload assembly 200 provided by the actions of the deployment hinge assemblies 500 provides a force that keeps payload contacts 221 on the payload assembly 200 in controlled contact with the payload release plate 610 during the ejection sequence. When the deployment hinge assemblies 500 have reached their full range of motion and no longer provide an acceleration, then the payload contacts 221 simply move away from the payload release plate 610 and the payload assembly 200 and payload 800 are then independent of the host satellite 700.

It should be emphasised that the current payload ejection system 100 does not require an additional latch device between the payload release plate 610 and the payload assembly 200 which would have to be timed to release at or just before full extension of the PEM hinge assemblies 500. This lack of a need for additional latches is enabled by the deployment hinge assemblies 500 providing the uni-axial ejection force and is predicated on the center of mass of the payload 800 and the payload assembly 200 lying within the rectangle formed by the four payload contacts 221.

As described above, the connection of the PEM 300 to the payload assembly 200 once the final release mechanism has been released is between the payload release plate 610 and the payload contacts 221. This connection is a 'push-contact' only. This is chosen to ensure that once the ejection event has begun there is no risk that separation would not occur. This then requires that the center of mass of the payload assembly 200 is within the area contained by the payload contacts 221 on the payload assembly 200 and payload release plate 610. This applies to all embodiments disclosed herein. Otherwise a tipping effect would occur regardless of the parallel motion provided by the ejection linkage. It is possible to add a latch feature that would prevent this tipping if the center of mass was outside of this contact pattern, but the release of the latches would need to be timed so as not to interfere with the payload assembly 200 at the moment of separation from the PEM 300.

Figure 8:
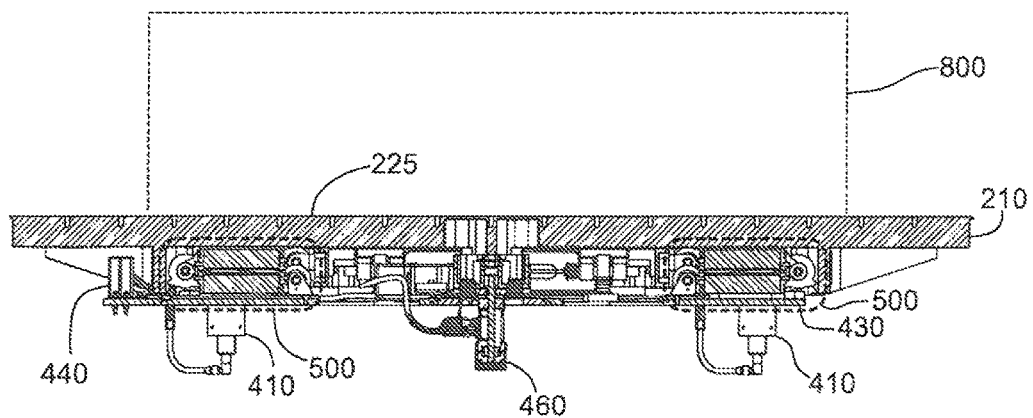
FIG. 8 is a section along the line 8-8 in FIG. 2 illustrating the relative positions of the major assemblies in the stowed configuration including the payload 800, payload attachment features 225, payload chassis 210, mounting plate 430, PES to host connectors 440, launch lock assemblies 410, release mechanism 460, and deployment hinge assemblies 500.

FIG. 8 shows the payload ejection system 100 in its stowed configuration. The payload 800 can be virtually anything compatible with the space environment. This includes, but is not limited to small satellites, satellite subcomponents, space system consumables such as propellant or tools, components for the construction or maintenance of space systems, etc. The payload 800 can also be a unitary item or an aggregate of items fastened individually to the payload chassis 210 using the payload attachment features 225. The payload attachment features 225 are simple threaded holes in this embodiment, however, depending upon the mission or the payload these features may also be a plurality of passive or active (motorized) attachment mechanisms each of which facilitates the mechanical attachment of the payload(s) 800 plus providing access to power, data and heat from the host 700 via cable harnesses that originate in the host 700 and pass to the payload via the payload to host connectors 440b, the payload harness 432, the circuit board 436, the payload to PEM connectors 435, the payload electrical connectors 230 and the mission specific harness(es) that would lead from the payload electrical connectors 230 to the payload 800. This is not shown as it would be unique to each payload.

In order to ensure that the mechanism does not bind during activation, several features have been incorporated in the payload ejection system 100. Referring to FIG. 12, which shows the general arrangement of the deployment hinge assemblies 500, the combination of deployment force applied by the deployment springs 508 coupled with maximum offset distance 790 the payload 800 centre of gravity 750 can be from the geometric centre of the payload ejection mechanism 300 creates a moment or couple 770 that must be resisted by the deployment hinge assembly 500. Through the choice of manufacturing tolerances and the stiffnesses of the hinge plate 501 and 502 and hinge bearing 509, 510 and 511, the inevitable flexing that happens within the mechanism can be accommodated while minimising system mass and maximising the payload offset distance 790, thereby maximising the system's utility.

Referring to FIG. 16 the launch lock assemblies 410 are configured to minimise the chances of the lock release mechanism 411 failing to release the payload assembly 200 from the payload ejection mechanism 300. In the stowed configuration the exact clamping force needed to hold the payload assembly 200 to the payload ejection mechanism 300 is established during assembly by the use of a load cell 418 as one of the clamped components. The data from the load cell can be read during assembly and the load cell harness 418 can be trimmed at that point if continuous monitoring is not needed or the harness can be integrated into the payload electrical connector 230 via the payload harness pins 231.

When activated, the lock release mechanism 411 releases the retaining bolt 414 and the retraction spring 415 pulls the retaining bolt 414 back and up into the lock bolt housing 416, out of the way and minimising the chances of these bolts jamming the mechanism.

Referring to FIG. 20, to ensure the electrical connectors 230 and 435 between the payload assembly 200 and the payload ejection mechanism 300 separate cleanly the release mechanism 460 is rigidly fastened to the mounting plate 464 but the mounting plate 464 has limited freedom of movement in the radial and axial directions. This permits the assembly of parts rigidly held by the release mechanism 460 to accommodate the movement of the other parts of the payload ejection mechanism 300. This assembly of rigidly held parts includes the payload electrical box 240 with the attached payload electrical connectors 230, payload harness pins 231, payload to PEM connectors 435 with the attached PEM harness sockets 437. To further ensure alignment of the connectors 230 and 435 during separation the two connector alignment pins 434 slide within two connector alignment features 220 that are manufactured to tight tolerances to ensure binding does not occur.

Figure 15:
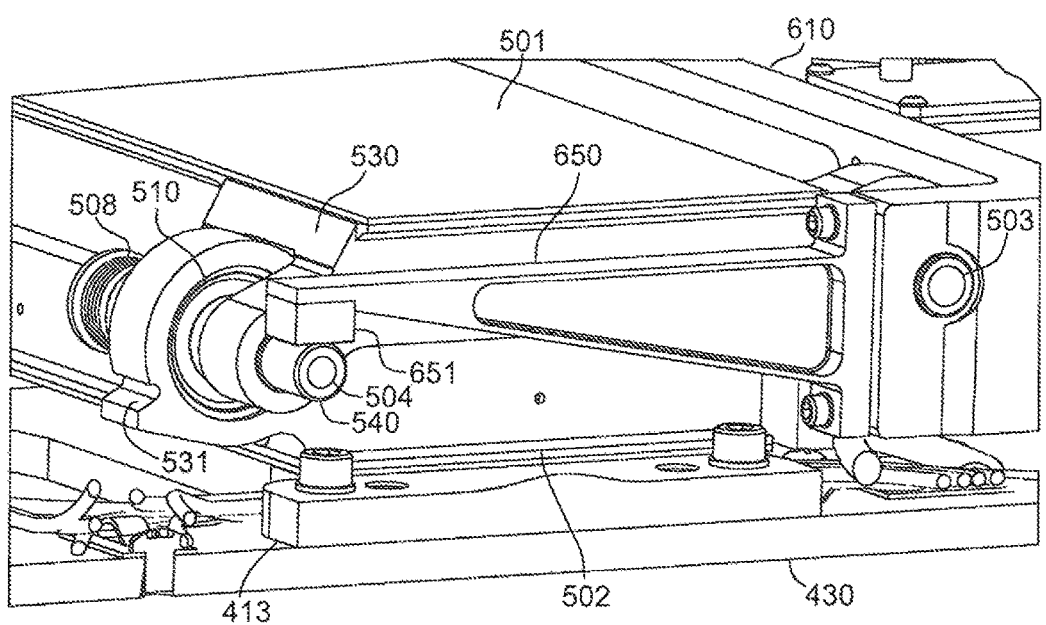
FIG. 15 is an oblique section view along line 15-15 of FIG. 2 of one of the deployment hinge assemblies 500 in the stowed configuration with the payload assembly 200 omitted for clarity. It shows how the snubbers 651 engage the snubber shaft 540 and the relative positions of the lock mounting plate 413, base plate 430, upper hinge plate 501, lower hinge plate 502, upper hinge pin 503, mid hinge pin 504, the deployment springs 508, mid hinge bearings 510, payload release plate 610 and snubber arms 650.

Referring to FIG. 15, when the deployment hinge assemblies 500 are collapsed in the stowed configuration there is some freedom of movement between the various elements of the mechanism. This freedom of movement can cause deleterious effects during the phases of the mission prior to the desired ejection of the payload assembly 200. This embodiment uses a series of compliant snubbers 651 to restrict and damp out potential element movement prior to payload assembly 200 ejection. The snubbers 651 are attached to the snubber arms 650 which are attached to the payload release plate 610 and are configured such that when the payload release mechanism is in the stowed configuration, there is a nominal interference between the snubber shaft 540 and the snubbers 651. The compliant nature of the snubbers 651 results in a spring force being applied to the snubber shafts 540 which acts to restrict the motion of the mid hinge pins 504 and thereby restricts and secures the rest of the components of the deployment hinge assemblies 500 preventing potential damage prior to the initiation of the command by the central computer system 1200.

Figure 9:
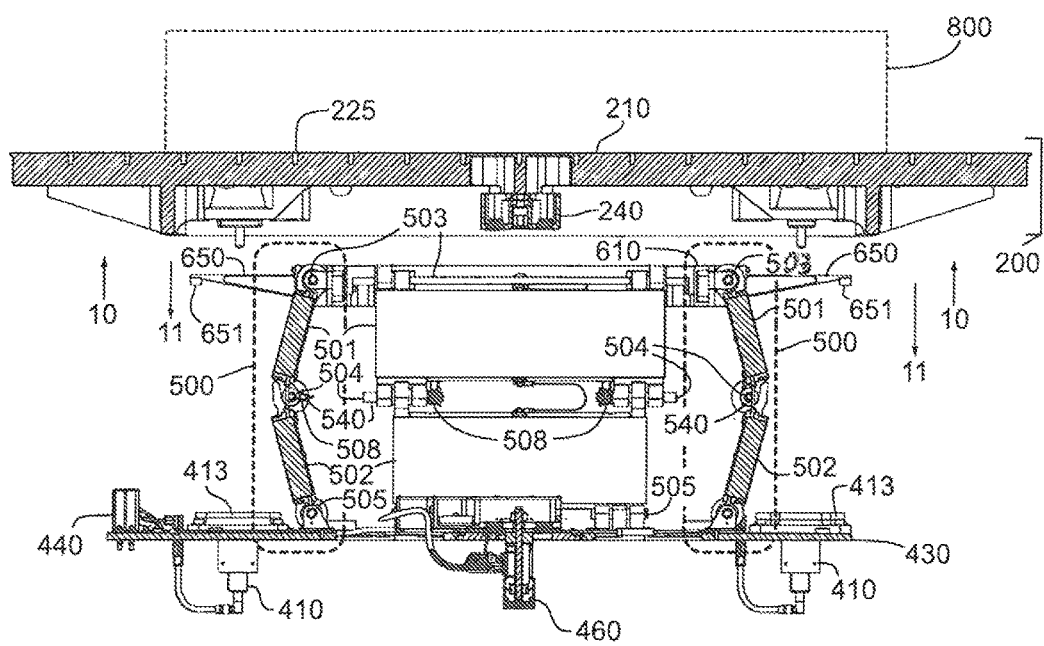
FIG. 9 is a section along the line 9-9 in FIG. 4 illustrating the relative positions of the major assemblies in the deployed configuration including the payload 800, payload assembly 200, payload attachment features 225, payload chassis 210, payload electrical box 240, mounting plate 430, PES to host connectors 440, launch lock assemblies 410, release mechanism 460, lock mounting plates 413, payload release plate 610, snubber arms 650, snubbers 651 and deployment hinge assemblies 500 with upper hinge plates 501, lower hinge plates 502, upper hinge pins 503, mid hinge pins 504, lower hinge pins 505, deployments springs 508, and snubber shafts 540.
Figure 10:
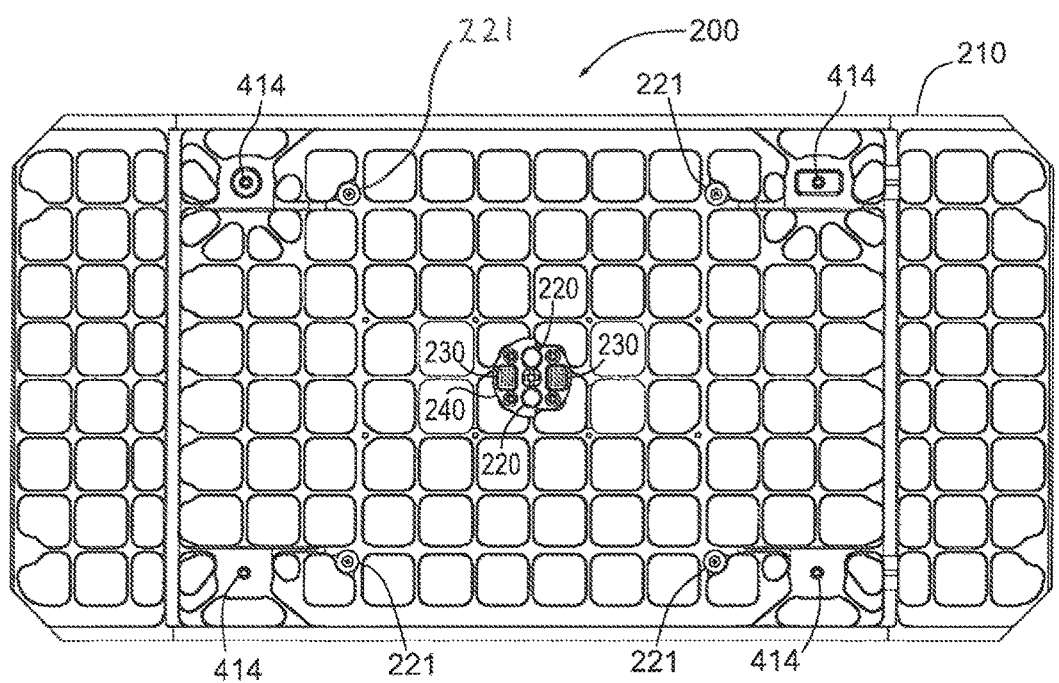
FIG. 10 is a view along arrows 10 in FIG. 9 and shows an underside view of the payload assembly 200 with the payload chassis 210, retaining bolts 414, payload contacts 221, connector alignment features 220, payload electrical connectors 230, and payload electrical box 240.
Figure 11:
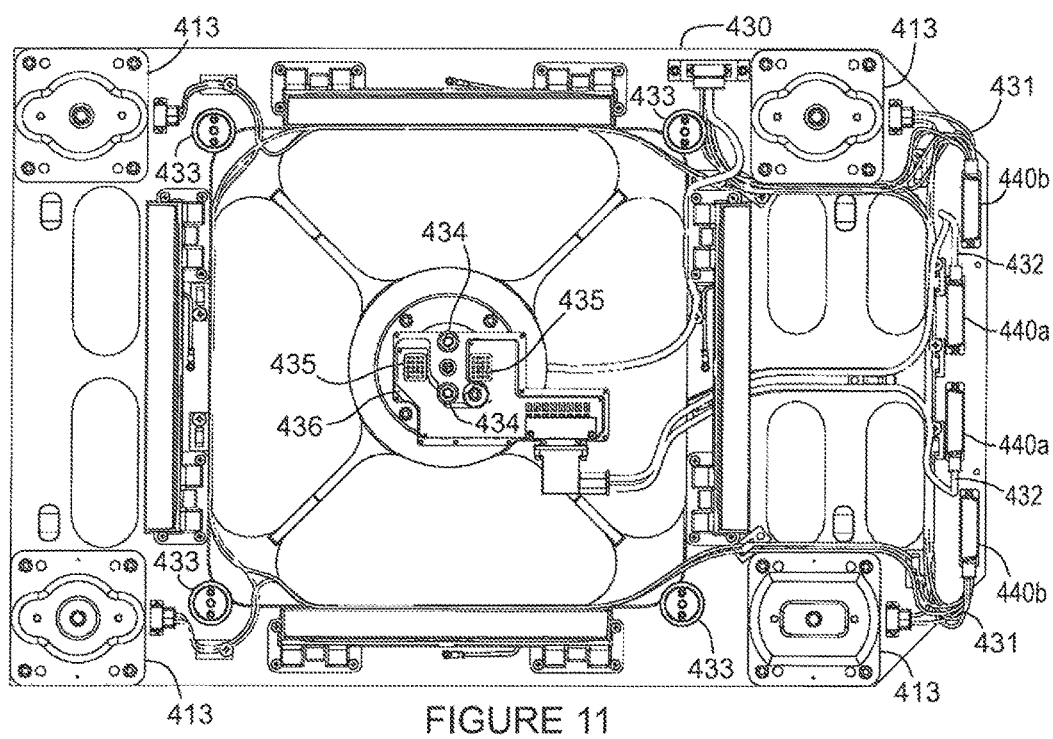
FIG. 11 is a view along arrows 11 in FIG. 9 and shows an overhead view of the mechanical mounting assembly 400 with the deployment hinge assemblies 500 and the payload release plate assembly 600 omitted for clarity. It shows the relative positions of the base plate 430, lock mounting plates 413, release plate contact 433, connector alignment pins 434, payload to PEM connectors 435, circuit board 436 and PES to host connectors 440a and 440b. In this embodiment a system of electrical redundancy has been instituted for reliability resulting in two equal and separate electrical circuits for each task. In addition, the payload harness 432 connecting the payload to the host 700 through the PES to host connector 440a is kept separate from the launch lock harness 431 that connects the various mechanisms and sensors on the Payload Ejection system 100 to the host spacecraft 700 through PES to host connector 440b.

Referring to FIGS. 8 and 9, the launch lock assemblies 410 are the primary structural connection between the payload assembly 200 and the payload ejection mechanism 300 that withstands the forces generated during the hosting spacecraft's launch from earth and orbital manoeuvres up to the time that payload ejection is initiated in the desired orbit.

In an alternate embodiment, the release mechanism assembly 460 can be designed to be capable of bearing the launch loads entirely, such that launch lock assemblies 410 would not be necessary. In this case, the structure of the release mechanism assembly 460 would be configured to act as the primary structural load path and bear the loads generated in the plane of the base plate 430 during spacecraft launch while the lock release mechanism 411 would provide the clamping load to react the launch loads perpendicular to the base plate 430.

There are several commercially available release mechanisms which may be chosen to be used for the launch release mechanism 411 or the release mechanism 460. The choice of mechanisms depends on the requirements for the mission. These mechanisms include frangible bolt systems, burn through mechanisms, separable nut systems and pyrotechnic systems, which will be well known by those skilled in the art. Key elements in this embodiment are that the launch release mechanisms 411 are sized to withstand the launch structural loads and the release mechanism needs to be sized only to hold back the deployment springs 508 prior to the final command to eject the payload assembly 200.

An alternate embodiment would exchange the stored energy activation of the deployment springs 508 for a powered actuator(s) that drive the hinge plates 501 and 502 to deploy. Using a powered actuator can confer a different acceleration profile to the payload assembly 200 which may be advantageous in some situations or environments.

An alternate embodiment would add features to the payload assembly 200 suitable to permit the ejected payload 800 and attached payload assembly 200 to be grasped or captured by a device attached to a spacecraft for the purpose that this captured payload may be attached to or used by the capturing spacecraft. Payloads 800 where it might be desirable for them to be captured by a separate spacecraft would be payloads consisting spare parts, additional propellant, or mechanisms conferring additional features to the capturing spacecraft. It is in situations where the payload assembly 200 will be captured by another spacecraft where the greatly reduced tumble rates produced by the payload ejection system are especially advantageous. Reduced payload assembly 200 tumble rates significantly reduce the difficulty of another spacecraft capturing the ejected payload assembly 200.

Features that enhance or enable the capture of a payload assembly 200 by another satellite include, but are not limited to, things such as grapple features to enable the physical contact and capture between two spacecraft, visual or radar targets that enhance and enable manual or automated visual, LIDAR and radar tracking by the capturing spacecraft, interface mechanisms that enable the captured payload assembly 200 to be securely attached to the capturing spacecraft enabling the payload 800 to be utilised.

Examples of some of the features usable for a spacecraft to capture the payload assembly 200 are those used in the Orbital Express Demonstration Mission (Ogilvie, A., Autonomous Satellite Servicing Using the Orbital Express Demonstration Manipulator System, Proceedings of the 8th International Symposium on Artificial Intelligence, Robotics and Automation in Space, iSAIRAS, Pasadena, 2008 and Ogilvie, A., Autonomous Robotic Operations for On-Orbit Satellite Servicing, Sensors and Systems for Space Applications, Proc. Of SPIE Vol 6958, 695809, 2008).

The present payload ejection system may be retrofitted onto any suitable satellite to be used as a host spacecraft. The system may be under teleoperation by a remotely located operator, for example located on earth, in another spacecraft or in an orbiting space station. The system may also be autonomously controlled by a local Mission Manager with some levels of supervised autonomy so that in addition to being under pure teleoperation there may be mixed teleoperation/supervised autonomy.

An alternate embodiment would add features that would permit the payload ejection mechanism 300 to be retracted after activation and change the release mechanism 460 from a single use device such as the frangible bolt devise to one that can be reset remotely. Retraction features may include, but are not limited to, cables connected to a winch and motor or a piston and lever arrangement with appropriate hasps and latches. This would allow an additional device (not shown) to place additional payloads 800 and payload assemblies 200 upon the reset payload ejection mechanism 300 so that these additional payloads 800 and payload assemblies 200 may also be ejected. This is a useful embodiment in cases where multiple payloads are being launched with one payload ejection mechanism having a first payload 800 coupled thereto but where addition payloads 800 are stored on the host satellite and can be sequentially retrieved from their stored locations and ejected once the first payload has been ejected. An autoloader mounted on the host satellite may be programmed to fetch the additional payloads and mount them on the payload deployment plate. The autoloader would be pre-programmed to release the addition payloads from their storage berths. Optionally a vision system may be positioned on the host satellite so the re-launch operations may be controlled remotely by a human operator.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A method for controllably ejecting a payload from a host spacecraft, comprising:
    attaching a payload to a payload assembly, releasably affixing the payload assembly to a payload release plate of a payload ejection mechanism, said payload ejection mechanism including a release mechanism;
    said payload ejection mechanism including at least two deployment assemblies coupled to said base plate via a first hinge coupling at one end thereof to the base and at another end thereof to said payload release plate via a second hinge coupling, said at least two deployment assemblies being extendable between a stowed position and a fully extended position, said first and second hinge coupling each having a hinge axis, said hinge axes being non parallel to each other so that upon deployment said at least two deployment assemblies are constrained to deploy such that a plane of said payload assembly remains parallel to said base plate;
    wherein said payload ejection mechanism accommodates payloads having centers of mass not coincident with the geometric center of mass of said payload release plate in order to eject said payload assembly away from said host spacecraft such that an effective force vector generated by said payload ejection mechanism acts through a center of mass of said payload at a moment of release of said payload assembly from said payload ejection mechanism regardless of the location of said payload center of mass with respect to the geometric center of said payload release plate; and
    ejecting the payload assembly by activating the release mechanism to deploy said at least two deployment assemblies from their stowed positions to their fully extended positions to force the payload assembly away from the host satellite.

2. The method according to claim 1, wherein said at least two deployment assemblies are at least two deployment hinge assemblies, said at least two deployment hinge assemblies each including two hinge plates hinged together along a common mid-axis axis along the lengths of each of said hinge plates, and one hinge plate of each of said at least two deployment hinge assemblies being hinged to said base plate along said first hinge coupling and defining a lower hinge axis and the other hinge plate being hinged to said payload release plate along said first hinge coupling and defining an upper hinge axis, and wherein each said common mid-axis, lower hinge axis and upper hinge axis of a given deployment hinge assembly is coplanar with each respective said common mid-axis, lower hinge axis and upper hinge axis of all other deployment hinge assemblies.

3. The method according to claim 1, wherein said payload ejection mechanism includes at least four deployment hinge assemblies with a first of two pairs of said at least four deployment hinge assemblies being in opposed relationship, and with a second of two pairs of said at least four deployment hinge assemblies also being in opposed relationship such said at least four deployment hinge assemblies form a rectangular shape.

4. The method according to claim 2, including at least one launch lock mechanism for restraining and securing said payload ejection system and said payload assembly until a commanded time of deployment at which time the launch lock mechanism is disengaged.

5. The method according to claim 2, wherein said payload ejection mechanism includes an actuator to actuate said release mechanism.

6. The method according to claim 5, wherein said actuator includes springs to actuate said payload ejection mechanism.

7. The method according to claim 5, wherein said actuator includes a motor to actuate said payload ejection mechanism.

8. The method according to claim 1, wherein said payload assembly is permanently attachable to a payload.

9. The method according to claim 1, wherein said payload assembly is releasably attachable to a payload.

* * * * *